(12) United States Patent
Motoyama et al.

(10) Patent No.: US 7,533,344 B1
(45) Date of Patent: *May 12, 2009

(54) APPLICATION UNIT MONITORING AND REPORTING SYSTEM AND METHOD

(75) Inventors: Tetsuro Motoyama, Cupertino, CA (US); Avery Fong, Castro Valley, CA (US); Yevgeniya Lyapustina, La Selva Beach, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/393,677

(22) Filed: Sep. 10, 1999

(51) Int. Cl.
*G06F 3/00* (2006.01)

(52) U.S. Cl. .................. 715/736; 715/741; 715/745; 715/748; 715/752; 709/224; 709/225

(58) Field of Classification Search .................. 345/736, 345/741, 745, 748, 752; 709/224, 225
See application file for complete search history.

(56) References Cited

U.S. PATENT DOCUMENTS

| | | |
|---|---|---|
| 4,815,070 A | 3/1989 | Hoshi |
| 5,067,107 A | 11/1991 | Wade |
| 5,412,779 A | 5/1995 | Motoyama |
| 5,537,554 A | 7/1996 | Motoyama |
| 5,544,289 A | 8/1996 | Motoyama |
| 5,568,618 A | 10/1996 | Motoyama |
| 5,649,120 A | 7/1997 | Motoyama |
| 5,774,678 A | 6/1998 | Motoyama |
| 5,793,948 A | 8/1998 | Asahi et al. |
| 5,818,603 A | 10/1998 | Motoyama |
| 5,819,110 A | 10/1998 | Motoyama |

(Continued)

FOREIGN PATENT DOCUMENTS

| | | |
|---|---|---|
| EP | 0 938 036 | 8/1999 |
| FR | 2 793 915 | 11/2000 |
| JP | 09-091179 | 4/1997 |
| JP | 10-326245 | 12/1998 |

OTHER PUBLICATIONS

R. A. Maxion, et al., IEEE Comp. Soc. Press, pp. 89-98, XP-000785879, "Metristation: a Tool for User-Interface Fault Detection", Jun. 24-27, 1997.

(Continued)

*Primary Examiner*—Weilun Lo
*Assistant Examiner*—Mylinh Tran
(74) *Attorney, Agent, or Firm*—Oblon, Spivak, McClelland, Maier & Neustadt, P.C.

(57) ABSTRACT

A system for monitoring a user's usage of a target application. Such a target application can, as examples, be a software program running on a computer or a workstation, an image forming device, an appliance, etc. The target application includes a user interface with a plurality of commands which a user can select. In the example of the target application being a software program, the commands may be icons displayed on a computer screen which a user can point to with a mouse pointer and then click on. In the case of the target application being an image forming device or an appliance, the interface may be an operation panel with buttons, a touch pad, etc. which a user can press. The present invention monitors the user's usage of such interfaces and logs data of the user's usage of such interfaces. The logged data is stored in the form of an abstract class, and the abstract class is sent to a sending unit. The logged data can then be communicated by the sending unit by Internet mail to a designated location.

24 Claims, 22 Drawing Sheets

U.S. PATENT DOCUMENTS

| | | | |
|---|---|---|---|
| 5,887,216 | A | 3/1999 | Motoyama |
| 5,897,498 | A * | 4/1999 | Canfield, II et al. ......... 600/437 |
| 5,908,493 | A | 6/1999 | Krymsky |
| 5,909,493 | A | 6/1999 | Motoyama |
| 6,003,070 | A * | 12/1999 | Frantz ....................... 709/206 |
| 6,018,619 | A * | 1/2000 | Allard et al. ................ 709/224 |
| 6,052,730 | A * | 4/2000 | Felciano et al. ............. 709/225 |
| 6,085,196 | A | 7/2000 | Motoyama et al. |
| 6,163,802 | A * | 12/2000 | Lin et al. .................... 709/217 |
| 6,181,981 | B1 * | 1/2001 | Varga et al. ................. 700/236 |
| 6,208,956 | B1 | 3/2001 | Motoyama |
| 6,279,015 | B1 | 8/2001 | Fong et al. |
| 6,400,381 | B1 * | 6/2002 | Barrett et al. ............... 345/758 |
| 6,446,076 | B1 * | 9/2002 | Burkey et al. ............... 707/102 |
| 6,446,119 | B1 * | 9/2002 | Olah et al. .................. 709/224 |

OTHER PUBLICATIONS

IBM Technical Disclosure Bulletin, vol. 38, No. 5, pp. 253-254, XP-000519569, "Lan-Based Keystroke Monitor", May 1, 1995.

R.A. Maxion, et al., IEEE Comp. Soc. Press., pp. 89-98, "Metristation: a Tool for User-Interface Fault Detection", Jun. 24, 1997.

IBM Technical Disclosure Bulletin, vol. 39, No. 3, pp. 155-156, "Object Oriented Approach to Handling Multiple Log Files", Mar. 1, 1996.

U.S. Appl. No. 09/393,677, filed Sep. 10, 1999, Motoyama et al.
U.S. Appl. No. 11/194,689, filed Aug. 2, 2005, Motoyama.
U.S. Appl. No. 11/191,045, filed Jul. 28, 2005, Motoyama et al.
U.S. Appl. No. 11/341,434, filed Jan. 30, 2006, Motoyama et al.
U.S. Appl. No. 11/437,627, filed May 22, 2006, Motoyama et al.
U.S. Appl. No. 11/544,560, filed Oct. 10, 2006, Motoyama et al.
U.S. Appl. No. 11/544,564, filed Oct. 10, 2006, Motoyama et al.
U.S. Appl. No. 11/544,562, filed Oct. 10, 2006, Motoyama et al.
U.S. Appl. No. 11/544,688, filed Oct. 10, 2006, Motoyama et al.
U.S. Appl. No. 11/546,983, filed Oct. 13, 2006, Motoyama et al.
U.S. Appl. No. 11/073,635, filed Mar. 8, 2005, Motoyama.
U.S. Appl. No. 10/830,064, filed Apr. 23, 2004, Motoyama et al.
U.S. Appl. No. 10/831,187, filed Apr. 26, 2004, Motoyama et al.
U.S. Appl. No. 08/880,683, filed Jun. 23, 1997, Pending.
U.S. Appl. No. 08/916,009, filed Aug. 21, 1997, Pending.
U.S. Appl. No. 09/108,705, filed Jul. 1, 1998, Pending.
U.S. Appl. No. 09/107,989, filed Jul. 1, 1998, Pending.
U.S. Appl. No. 09/408,443, filed Sep. 29, 1999, Pending.
U.S. Appl. No. 09/407,769, filed Sep. 29, 1999, Pending.
U.S. Appl. No. 09/393,677, filed Sep. 10, 1999, Pending.
U.S. Appl. No. 09/440,692, filed Nov. 16, 1999, Pending.
U.S. Appl. No. 09/440,647, filed Nov. 16, 1999, Pending.
U.S. Appl. No. 09/440,646, filed Nov. 16, 1999, Pending.
U.S. Appl. No. 09/440,693, filed Nov. 16, 1999, Pending.
U.S. Appl. No. 09/440,645, filed Nov. 16, 1999, Pending.
U.S. Appl. No. 09/520,368, filed Mar. 7, 2000, Pending.
U.S. Appl. No. 09/542,284, filed Apr. 4, 2000, Pending.
U.S. Appl. No. 09/457,669, filed Dec. 9, 1999, Pending.
U.S. Appl. No. 09/453,877, filed Feb. 4, 2000, Pending.
U.S. Appl. No. 09/453,934, filed May 17, 2000, Pending.
U.S. Appl. No. 09/453,935, filed May 17, 2000, Pending.
U.S. Appl. No. 09/453,936, filed May 17, 2000, Pending.
U.S. Appl. No. 09/453,937, filed May 17, 2000, Pending.
U.S. Appl. No. 09/782,164, filed Feb. 14, 2001, Pending.
U.S. Appl. No. 09/782,083, filed Feb. 14, 2001, Pending.
U.S. Appl. No. 09/782,064, filed Feb. 14, 2001, Pending.
U.S. Appl. No. 09/782,187, filed Feb. 14, 2001, Pending.
U.S. Appl. No. 09/756,120, filed Jan. 9, 2001, Pending.
U.S. Appl. No. 08/738,659, filed Oct. 30, 1996, Pending.
U.S. Appl. No. 08/738,461, filed Oct. 30, 1996, Pending.
U.S. Appl. No. 08/883,492, filed Jun. 26, 1997, Pending.
U.S. Appl. No. 09/192,583, filed Nov. 17, 1998, Pending.
U.S. Appl. No. 09/311,148, filed May 13, 1999, Pending.
U.S. Appl. No. 10/167,497, filed Jun. 13, 2002, Pending.
U.S. Appl. No. 10/913,337, filed Aug. 9, 2004, Motoyama et al.
U.S. Appl. No. 10/927,283, filed Aug. 27, 2004, Motoyama et al.
U.S. Appl. No. 10/913,364, filed Aug. 9, 2004, Motoyama et al.
U.S. Appl. No. 10/913,431, filed Aug. 9, 2004, Motoyama et al.
U.S. Appl. No. 10/927,158, filed Aug. 27, 2004, Motoyama et al.
U.S. Appl. No. 10/913,450, filed Aug. 9, 2004, Motoyama et al.
U.S. Appl. No. 10/927,257, filed Aug. 27, 2004, Motoyama et al.
U.S. Appl. No. 11/042,167, filed Jan. 26, 2005, Motoyama et al.
U.S. Appl. No. 11/311,248, filed Dec. 20, 2005, Motoyama.
U.S. Appl. No. 11/742,939, filed May 1, 2007, Motoyama.
U.S. Appl. No. 11/389,262, filed Mar. 27, 2006, Motoyama

* cited by examiner

CommandUsage() Scenario

CommandUsage() Scenario

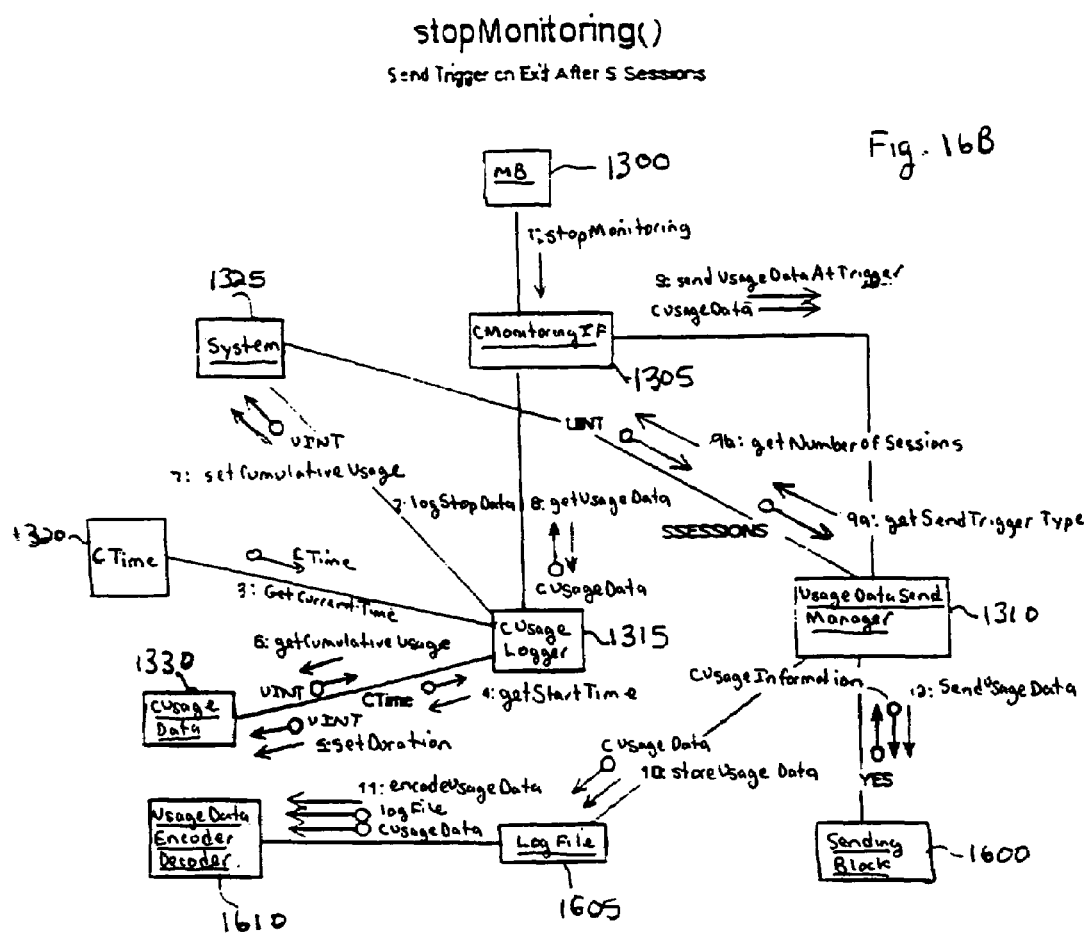

Map        FIG. 20

| Key | Value |
|---|---|
|  |  |
|  |  |
|  |  |

APPLICATION UNIT MONITORING AND REPORTING SYSTEM AND METHOD

CROSS-REFERENCES TO RELATED APPLICATIONS

The present application is related to U.S. patent application Ser. No. 09/311,148 filed May 13, 1999, entitled "Application Unit Monitoring and Reporting System and Method", U.S. patent application Ser. No. 09/192,583 filed Nov. 17, 1998 entitled "Method and System for Communicating With a Device Attached to a Computer Using Electronic Mail Messages," U.S. patent application Ser. No. 08/883,492 filed Jun. 26, 1997 entitled "Method and System for Diagnosis and Control of Machines Using Connectionless Modes Having Delivery Monitoring and an Alternate Communication Mode," U.S. patent application Ser. No. 08/820,633 filed Mar. 19, 1997, now U.S. Pat. No. 5,887,216, entitled "Method and System to Diagnose a Business Office Device Based on Operating Parameters Set by a User," U.S. patent application Ser. No. 08/733,134 filed Oct. 16, 1996 entitled "Method and System for Diagnosis and Control of Machines Using Connectionless Modes of Communication," U.S. patent application Ser. No. 08/624,228 filed Mar. 29, 1996, now U.S. Pat. No. 5,818,603, entitled "Method and System for Controlling and Communicating with Machines Using Multiple Communication Formats," U.S. patent application Ser. Nos. 08/738,659 and 08/738,461, both of which are entitled "Method and System for Diagnosis and Control of Machines Using Connection and Connectionless Modes of Communication," filed Oct. 30, 1996, and are divisions of U.S. patent application Ser. No. 08/463,002 filed Jun. 5, 1995, entitled "Method and System for Diagnosis and Control of Machines Using Connection and Connectionless Modes of Communication", now U.S. Pat. No. 5,819,110, and U.S. patent application Ser. No. 08/852,413 filed May 7, 1987, entitled "Method and System for Controlling and Communicating with Business Office Devices," now U.S. Pat. No. 5,774,678, which is a continuation of U.S. patent application Ser. No. 08/698,068 filed Aug. 15, 1996, entitled "Method and Apparatus for Controlling and Communicating With Business Office Devices", now U.S. Pat. No. 5,649,120 which is a continuation of U.S. patent application Ser. No. 08/562,192 filed Nov. 22, 1995, which is a continuation of U.S. patent application Ser. No. 08/473,780 filed Jun. 6, 1995, entitled "Method and Apparatus for Controlling and Communicating With Business Office Devices", now U.S. Pat. No. 5,544,289, which is a continuation of U.S. patent application Ser. No. 08/426,679 filed Apr. 24, 1995, now U.S. Pat. No. 5,537,554, entitled "Method and Apparatus for Controlling and Communicating With Business Office Devices" which is a continuation of U.S. patent application Ser. No. 08/282,168 filed Jul. 28, 1994 and entitled "Method and Apparatus for Controlling and Communicating With Business Office Devices", now U.S. Pat. No. 5,412,779, which is a continuation of U.S. patent application Ser. No. 07/902,462 filed Jun. 19, 1992, now abandoned, which is a continuation of U.S. patent application Ser. No. 07/549,278, filed Jul. 6, 1990, now abandoned, the disclosure of each is incorporated herein by reference.

BACKGROUND OF THE INVENTION

1. Field of the Invention

This invention generally relates to an application unit monitoring device which can monitor a user's usage of a target application of an application unit, and which can easily and efficiently communicate data of the monitored usage.

2. Discussion of the Background

With the rise of computer usage, software development has clearly become a significant business. In evaluating software, it may be beneficial to monitor exactly how a user utilizes a software application. As an example, it may be helpful for a software developer to know which commands a user uses most often.

Further, in designing devices with which a human interacts, it may be desirable to monitor how the user interacts with such a device. As an example, it may be desirable to monitor how a user utilizes a control panel of an image forming device such as a copying machine, facsimile machine, printer, scanner, an appliance such as a microwave oven, VCR, digital camera, cellular phone, palm top computer, etc.

Further, more and more users are utilizing the Internet. There is significant interest in how users use the Internet, particularly with respect to how users may use certain web pages etc. Monitoring a user's usage of the Internet thereof may also become significant.

In these instances when it is desired to determine how a user is utilizing a certain application, for example a software application, a device with an interface to be operated by a user, a web page, etc., not only must the user's usage of the application unit be monitored, but the information obtained by monitoring the user's usage must be effectively communicated to a desired party.

SUMMARY OF THE INVENTION

One object of the present invention is to provide a novel and effective system for monitoring a user's usage of a target application of an application unit.

A further object of the present invention is to provide a novel system for communicating data obtained by monitoring a user's usage of a target application of an application unit to a desired party.

A further object of the present invention is to provide an efficient communication of the monitored usage information from a monitoring unit to a sending unit.

The present invention achieves these and other objects by monitoring the usage of a user interface of a target application of an application unit. Such a monitoring can, as one example, monitor a software program being executed on a computer or workstation under control by a user, usage of a control panel of an image forming apparatus such as a copying machine, printer, facsimile, scanner, an appliance such as a microwave oven, VCR, digital camera, cellular phone, palm top computer, etc., or any other device or system which has a user interface. The data obtained by monitoring a user's usage of a target application of an application unit can, as a further feature in the present invention, be collected and logged and then communicated to a desired location by Internet email. The use of email communication reduces the costs associated with communicating such data. The data can be communicated to the desired location at several instances, including each time a user exits a target application of an application unit, or after a predetermined number of times that a user has utilized and exited the target application of the application unit.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 16(a) and 16(b) show stop monitoring operations which can be executed in the present invention;

FIG. 20 shows the structure used by the abstract class;

DESCRIPTION OF THE PREFERRED EMBODIMENTS

Figure 1:
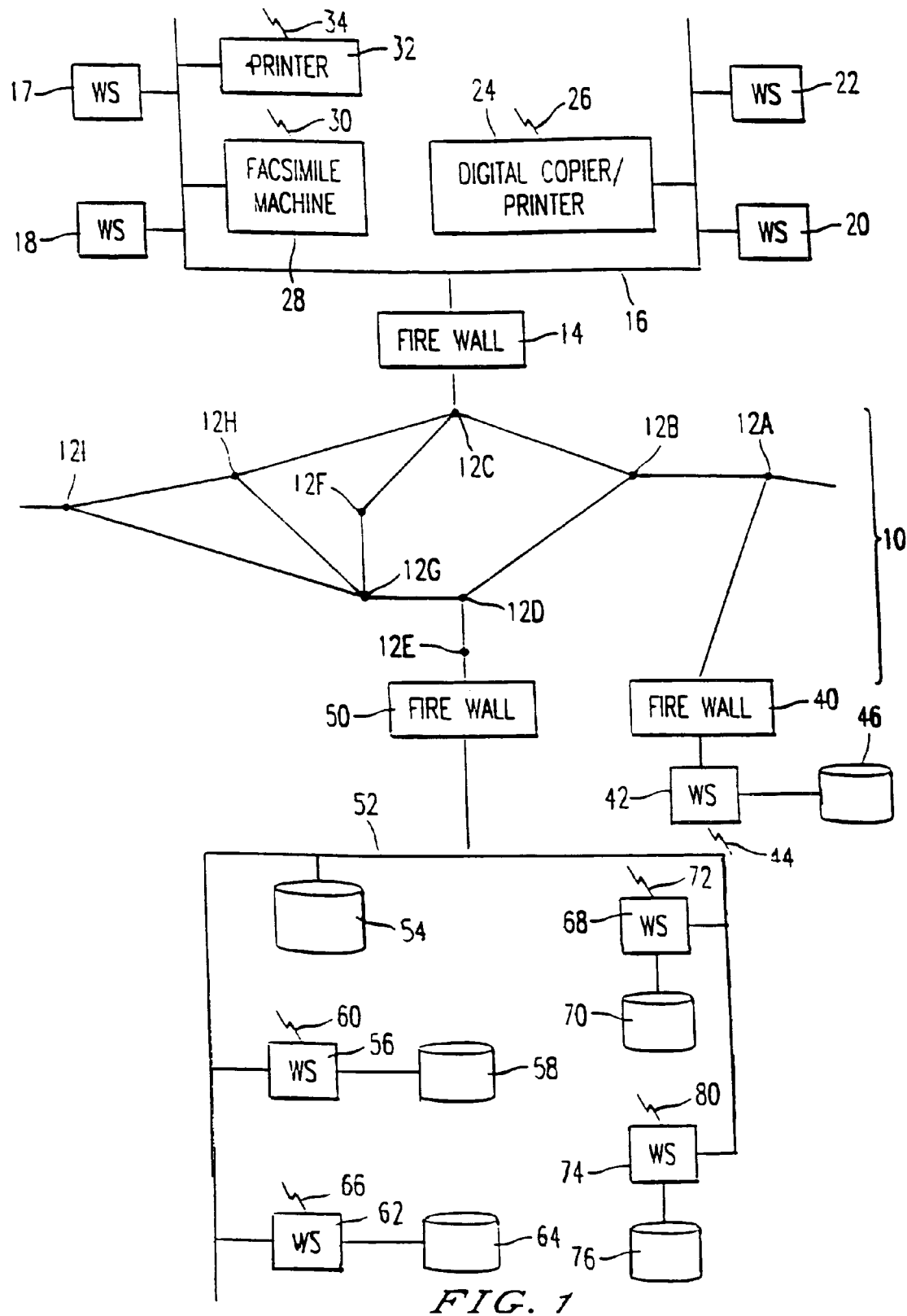
FIG. 1 illustrates three networked business office machines connected to a network of computers and data bases through the Internet.

Referring now to the drawings, wherein like reference numerals designate identical or corresponding parts throughout the several views, and more particularly to FIG. 1 thereof, there is illustrated a figure showing various machines and computers for monitoring, diagnosing and controlling the operation of the machines. In FIG. 1, there is a first network 16, such as a Local Area Network (LAN) connected to computer workstations 17, 18, 20 and 22. The workstations can be any type of computers including IBM Personal Computer compatible devices, Unix based computers, or Apple Macintoshes. Also connected to the network 16 are a digital copier/printer 24, a facsimile machine 28, and a printer 32. The devices 24, 28 and 32 and the workstations 17, 18, 20 and 22 are referred to as machines or monitored devices and other types of devices may be used as the machines or monitored devices, including any of the devices discussed below. Also, a facsimile server (not illustrated) may be connected to the network 16 and have a telephone, ISDN (Integrated Services Digital Network), or cable connection. In addition to the digital copier/printer 24, facsimile machine 28, and printer 32 being connected to the network 16, these devices may also include conventional telephone and/or ISDN and/or cable connections 26, 30 and 34, respectively. As is explained below, the business office machines or business devices 24, 28 and 32 communicate with a remote monitoring, diagnosis and control station, also referred to as a monitoring device, through the Internet via the network 16 or by a direct telephone, ISDN, wireless, or cable connection.

In FIG. 1, the Internet is generally designated by 10. The Internet 10 includes a plurality of interconnected computers and routers designated by 12A-12I. The manner of communicating over the Internet is known through RFC documents obtained by FTP at NIC.DDN.MIL or at FTP NISC.SRI.COM. TCP/IP related communication is described for example in the book "TCP/IP Illustrated," Vol. 1, The Protocols, by Stevens, from Addison-Wesley Publishing Company, 1994, which is incorporated herein by reference.

In FIG. 1, a firewall 14 is connected between the Internet 10 and the network 16. A firewall is a device that allows only authorized computers to access a network or other computers via the Internet. Firewalls are known and commercially available devices and/or software and, for example, include SunScreen from Sun Microsystems Inc. Similarly, a firewall 50 is connected between the Internet 10 and a network 52. Also, a firewall 40 is connected between the Internet 10 and a workstation 42.

The network 52 is a conventional network and includes a plurality of workstations 56, 62, 68 and 74. These workstations may be different departments within a company such as a marketing, manufacturing, design engineering and customer service departments. In addition to the workstations connected via the network 52, there is a workstation 42 which is not directly connected to the network 52. Information in a data base stored in a disk 46 may be shared using proper encryption and protocols over the Internet to the workstations connected directly to the network 52. Also, the workstation 42 includes a direct connection to a telephone line and/or ISDN and/or cable 44 and the data base in disk 46 may be accessed through the telephone line, ISDN, or cable. The cable used by this invention may be implemented using a cable which typically is used to carry television programming, a cable which provides for high speed communication of digital data typically used with computers or the like, or may be implemented using any desired type of cable.

Information of the business office machines 24, 28 and 32 may be stored in one or more of the data bases stored in the disks 46, 54, 58, 64, 70 and 76. Each of the customer service, marketing, manufacturing, and engineering departments may have their own data base or may share from one or more data bases. Each of the disks used to store data bases is a nonvolatile memory such as a hard disk or optical disk. Alternatively, the data bases may be stored in any storage device including solid state and/or semiconductor memory devices. As an example, disk 64 contains the marketing data base, disk 58 contains the manufacturing data base, disk 70 contains the engineering data base and disk 76 contains the customer service data base. Alternatively, the disks 54 and 46 store one or more of the data bases.

In addition to the workstations 56, 62, 68, 74 and 42 being connected to the Internet, these workstations may also include a connection to a telephone line, ISDN, or cable which provides a secure connection to the machine being monitored, diagnosed and/or controlled and is used during a connection-mode of communication. Additionally, if one of the Internet, telephone, ISDN, or cable is not operating properly, one of the others can be automatically used for communication.

A feature of the present invention is the use of a connectionless-mode of communication (e.g., Internet email) or transmission between a machine and a computer for diagnosing and controlling the machine. Alternatively, the email which is transmitted may be implemented using a connection mode of communication. The IBM Dictionary of Computing by George McDaniel, 1994, defines a connectionless-mode transmission to be the transmission of a single unit of data from a source service access point to one or more destination service access points without establishing a connection. The IBM Dictionary also defines a connection-mode transmission to be the transmission of units of data from a source service access point to one or more destination service access points via a connection. The connection is established prior to data transfer and released following data transfer. Additional information about the connection-mode and the connectionless-mode of operation is described in the Handbook of Computer-Communications Standards, Vol. 1, 2nd Edition, by William Stallings, 1990, which is incorporated herein by reference. In order to transfer data from one DTE (Data Terminal Equipment) to another DTE, there is a unique identifier or address for each DTE. This unique identifier or address is usable in both connectionless-modes and connection-modes of communication.

Figure 2:
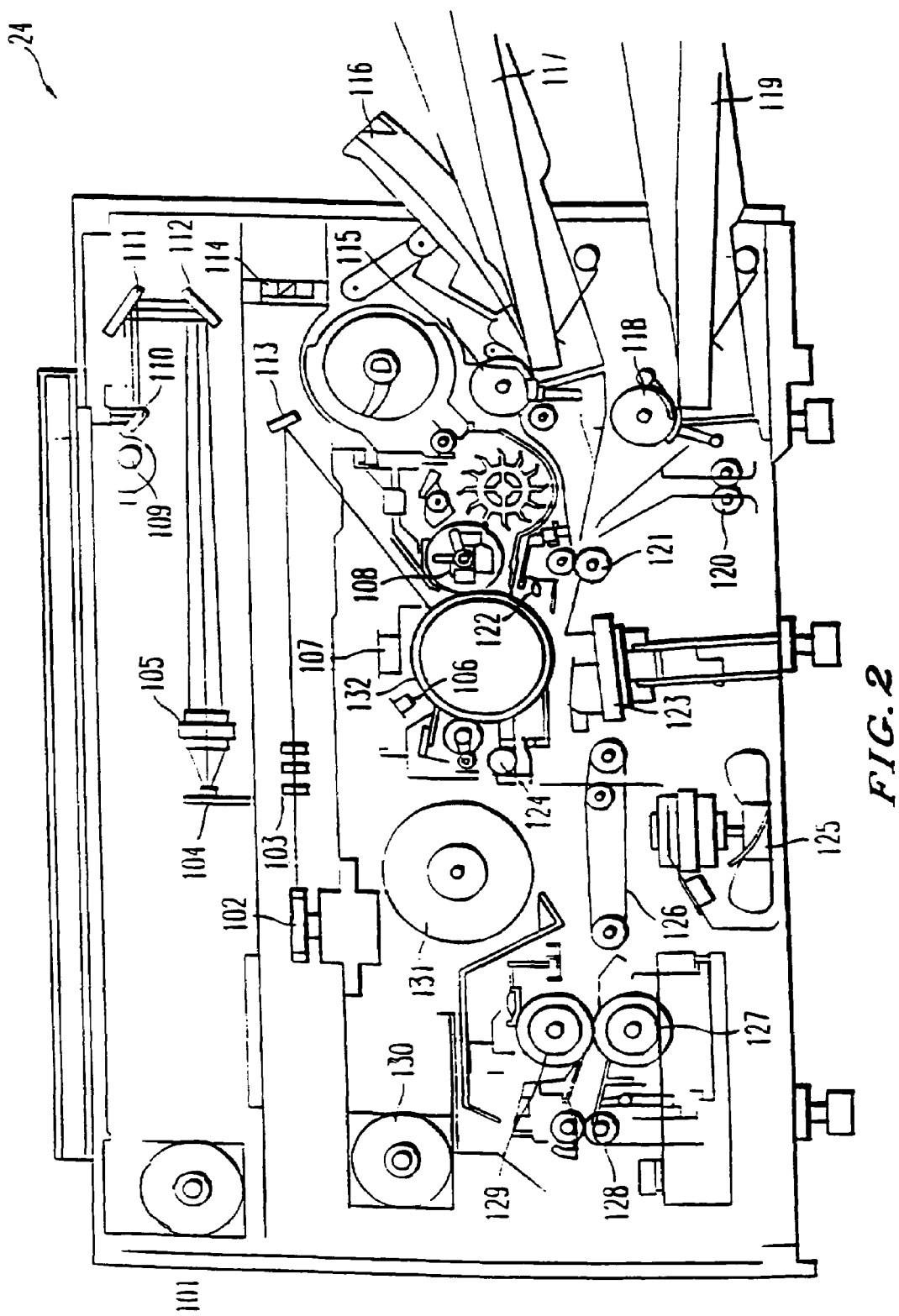
FIG. 2 illustrates the components of a digital copier/printer.

FIG. 2 illustrates the mechanical layout of the digital copier/printer 24 illustrated in FIG. 1. In FIG. 2, 101 is a fan for the scanner, 102 is a polygonal mirror used with a laser printer, and 103 designates an Fθ lens used to collimate light from a laser (not illustrated).

Reference numeral 104 designates a sensor for detecting light from the scanner. 105 is a lens for focusing light from the scanner onto the sensor 104, and 106 is a quenching lamp used to erase images on the photoconductive drum 132. There is a charging corona unit 107 and a developing roller 108. Reference numeral 109 designates a lamp used to illuminate a document to be scanned and 110, 111 and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer, and 115 is a first paper feed roller used for feeding paper from the first paper cassette 117, and 116 is a manual feed table. Similarly, 118 is a second paper feed roller for the second cassette 119. Reference numeral 120 designates a relay roller, 121 is a registration roller. 122 is an image density sensor and 123 is a transfer/separation corona unit. Reference numeral 124 is a cleaning unit, 125 is a vacuum fan, 126 illustrates a transport belt, 127 is a pressure roller, and 128 is an exit roller. Reference numeral 129 is a hot roller used to fix toner onto the paper, 130 is an exhaust fan and 131 is the main motor used to drive the digital copier.

Figure 3:
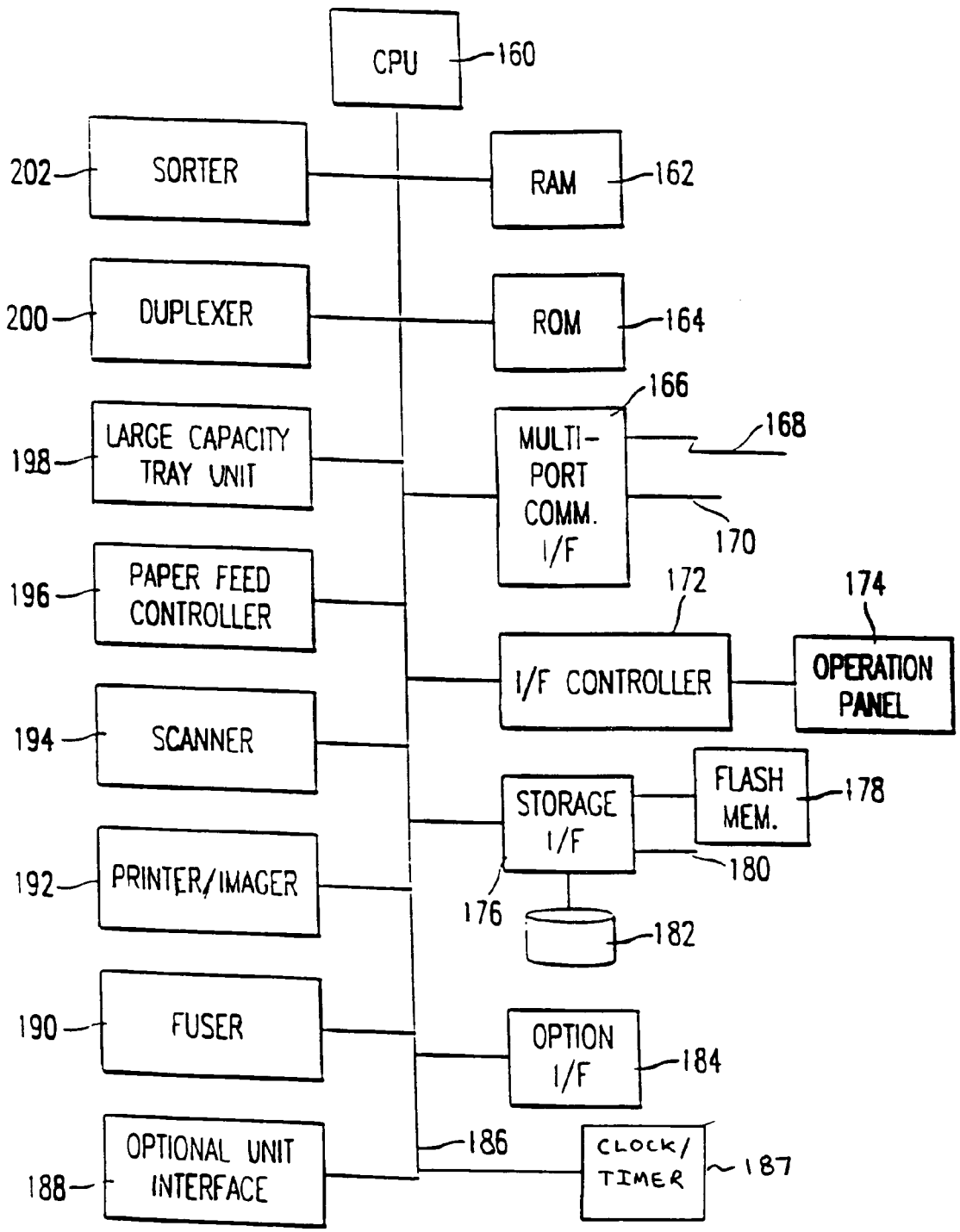
FIG. 3 illustrates the electronic components of the digital copier/printer illustrated in FIG. 2.

FIG. 3 illustrates a block diagram of the electronic components illustrated in FIG. 2. The CPU 160 is a microprocessor and acts as the system controller. There is a random access memory 162 to store dynamically changing information including operating parameters of the digital copier. A read only memory 164 stores the program code used to run the digital copier and also information describing the copier (static-state data) such as the model number, serial number of the copier, and default parameters.

There is a multi-port communication interface 166 which allows the digital copier to communicate with external devices. Reference numeral 168 represents a telephone, ISDN, or cable line and 170 represents a network. Further information of the multi-port communication interface is described with respect to FIG. 4. An interface controller 172 is used to connect an operation panel 174 to a system bus 186. The operation panel 174 includes standard input and output devices found on a digital copier including a copy button, keys to control the operation of the copier such as number of copies, reducement/enlargement, darkness/lightness, etc. Additionally, a liquid crystal display may be included within the operation panel 174 to display parameters and messages of the digital copier to a user.

A storage interface 176 connects storage devices to the system bus 186. The storage devices include a flash memory 178 which can be substituted by a conventional EEPROM and a disk 182. The disk 182 includes a hard disk, optical disk, and/or a floppy disk drive. There is a connection 180 connected to the storage interface 176 which allows for additional memory devices to be connected to the digital copier. The flash memory 178 is used to store semi-static state data which describes parameters of the digital copier which infrequently change over the life of the copier. Such parameters include the options and configuration of the digital copier. An option interface 184 allows additional hardware such as an external interface to be connected to the digital copier. A clock/timer 187 is utilized to keep track of both the time and date and also to measure elapsed time.

On the left side of FIG. 3, the various sections making up the digital copier are illustrated. Reference numeral 202 designates a sorter and contains sensors and actuators used to sort the output of the digital copier. There is a duplexer 200 which allows a duplex operation to be performed by the digital copier and includes conventional sensors and actuators. The digital copier includes a large capacity tray unit 198 which allows paper trays holding a large number of sheets to be used with the digital copier. The large capacity tray unit 198 includes conventional sensors and actuators.

A paper feed controller 196 is used to control the operation of feeding paper into and through the digital copier. A scanner 194 is used to scan images into the digital copier and includes conventional scanning elements such as a light, mirror, etc. Additionally, scanner sensors are used such as a home position sensor to determine that the scanner is in the home position and a lamp thermistor to ensure proper operation of the scanning lamp. There is a printer/imager 192 which prints the output of the digital copier and includes a conventional laser printing mechanism, a toner sensor, and an image density sensor. The fuser 190 is used to fuse the toner onto the page using a high temperature roller and includes an exit sensor, a thermistor to assure that the fuser 190 is not overheating, and an oil sensor. Additionally, there is an optional unit interface 188 used to connect to optional elements of the digital copier such as an automatic document feeder, a different type of sorter/collator, or other elements which can be added to the digital copier.

Figure 4:
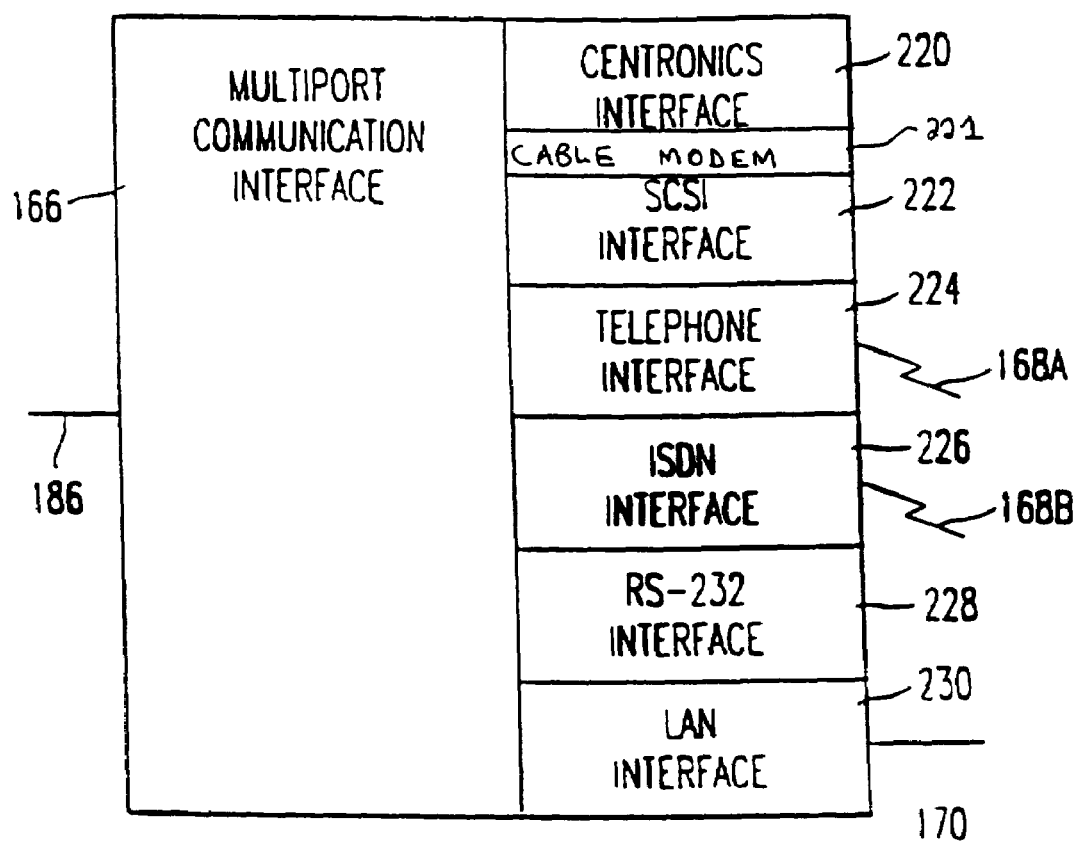
FIG. 4 illustrates details of the multi-port communication interface illustrated in FIG. 3.

FIG. 4 illustrates details of the multi-port communication interface 166. The digital copier may communicate to external devices through a Centronics interface 220 which receives or transmits information to be printed, a cable modem unit 221 which has a high speed connection over cable, a SCSI interface 222, a conventional telephone interface 224 which connects to a telephone line 168A, an ISDN interface 226 which connects to an ISDN line 168B, an RS-232 interface 228, and a LAN interface 230 which connects to a LAN 170. A single device which connects to both a Local Area Network and a telephone line is commercially available from Megahertz and is known as the Ethernet-Modem.

The CPU or other microprocessor or circuitry executes a monitoring process to monitor the state of each of the sensors of the digital copier, and a sequencing process is used to execute the instructions of the code used to control and operate the digital copier. Additionally, there is a central system control process executed to control the overall operation of the digital copier and a communication process used to assure reliable communication to external devices connected to the digital copier. The system control process monitors and controls data storage in a static state memory such as the ROM 164 of FIG. 3, a semi-static memory such as the flash memory 178 or disk 182, or the dynamic state data which is stored in a volatile or non-volatile memory such as the RAM 162 or the flash memory 178 or disk 182. Additionally, the static state data may be stored in a device other than the ROM 164 such as a non-volatile memory including either of the flash memory 178 or disk 182.

The above details have been described with respect to a digital copier but the present invention is equally applicable to other business office machines or devices such as an analog copier, a facsimile machine, a scanner, a printer, a facsimile server, or other business office machines, or an appliance with which a user interfaces such as a microwave oven, VCR, digital camera, cellular phone, palm top computer, etc. Additionally, the present invention includes other types of machines which operate using a connection-mode or connectionless-mode of communication, and also email, such as a metering system including a gas, water, or electricity metering system, vending machines, or any other device which performs mechanical operations, such as automobiles, and has a need to be monitored, and performs a function. In addition to monitoring special purpose machines, and computers, the invention can be used to monitor, control, and diagnose a general purpose computer which would be the monitored and/or controlled device.

Figure 5:
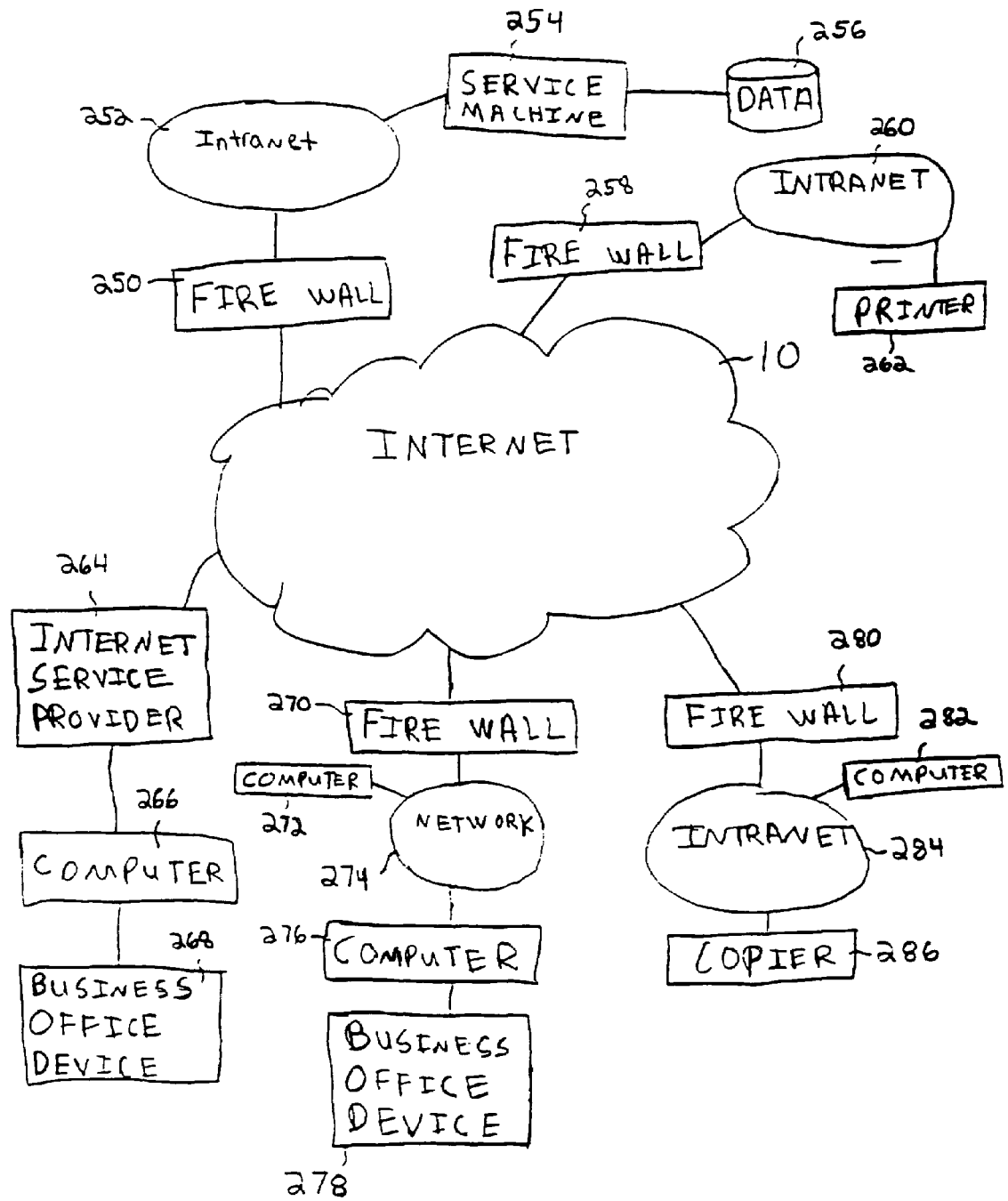
FIG. 5 illustrates an alternative system configuration in which business office devices are connected to a computer which is connected to a network, and also devices which are connected directly to the network.

FIG. 5 illustrates an alternative system diagram of the invention in which different devices and subsystems are connected to the Internet 10. However, there is no requirement to have each of these devices or subsystems as part of the invention but any individual component or subsystem illustrated in FIG. 5 is also part of the invention. Further, the elements illustrated in FIG. 1 may be connected to the Internet 10 which is illustrated in FIG. 5. In FIG. 5, there is illustrated a fire wall 250 connected to an intranet 252. One of the computers or devices connected to the intranet 252 is a service machine 254 which includes therein or has connected thereto data 256 which may be stored in a data base format. The data 256 includes history, performance, malfunction, and any other information including statistical information of the operation or failure or set-up and components or optional equipment of devices which are being monitored. The service machine 254 may be implemented as the device or computer which requests the monitored devices to transmit data or which requests that remote control and/or diagnosis tests be performed on the monitored devices. The service machine 254 may be implemented as any type of device and is preferably implemented using a computerized device such as a general purpose computer.

Another sub-system of FIG. 5 includes a fire wall 258, an intranet 260, and a printer 262 connected thereto. In this sub-system, there is not a separate general purpose computer connected between the intranet 260 (or a different type of computer network) and the printer 262, but the functions of sending and receiving electronic mail messages by the printer 262 (and similarly by a copier 286) are performed by circuitry, a microprocessor, or any other type of hardware contained within or mounted to the printer 262.

An alternate type of sub-system includes the use of an Internet service provider 264 which may be any type of Internet service provider including known commercial companies such as America Online, Netcom, CompuServe, Niftyserve, the Internet service provider Erols, or any other Internet service provider. In this sub-system, a computer 266 is connected to the Internet service provider 264, through a modem, for example, such as a telephone line modem, a cable modem, modems which use any type of wires such as modems used over an ISDN (Integrated Services Digital Network) line, ASDL (Asymmetric Digital Subscriber Line), modems which use frame relay communication, any digital or analog modem, wireless modems such as a radio frequency modem, a fiber optic modem, or a device which uses infrared light waves. Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water, or gas utility meter, or any other device discussed herein.

Also illustrated in FIG. 5 is a fire wall 270 connected to a network 274. The network 274 may be implemented as any type of computer network, such as an Ethernet network, for example. Networking software which may be used to control the network includes any desired networking software including software commercially available from Novell or Microsoft. The network 274 may be implemented as an Intranet, if desired. A computer 272 connected to the network 274 may be used to obtain information from a business office device 278 and generate reports such as reports showing problems which occurred in various machines connected to the network and a monthly usage report of the devices connected to the network 274. In this embodiment, a computer 276 is connected between the business office device 278 and the network 274. This computer receives email communications from the network and forwards the appropriate commands or data, or any other information, to the business office device 278. While it has been stated that the business office device 278 is connected to the computer 276, there is no requirement for a wired connection between the business office device and the computer and communication between the business office device 278 and the computer 276 may be accomplished using wires or wireless methods including through the use of radio frequency connections and light connections which may be through an infrared connection, or through fiber optics. Similarly, each of the various networks and intranets illustrates in FIG. 5 may be established using any desired manner including through the establishment of wireless networks such as radio frequency networks. The wireless communication described herein may be established using spread spectrum techniques including techniques which use a spreading code and frequency hopping techniques such as the frequency hopping wireless network which is disclosed in the Bluetooth Specification which is described at the world wide web site www.bluetooth.com, which is incorporated herein by reference.

Another sub-system illustrated in FIG. 5 includes a fire wall 280, an intranet 284, a computer 282 connected thereto, and a copier 286. The computer 282 may be used to generate reports and request diagnostic or control procedures. These diagnostic and control procedures may be performed with respect to the copier 286 or any of the other devices illustrated in or used with FIG. 5. While FIG. 5 illustrates a plurality of fire walls, the fire walls are preferable but optional equipment and therefore the invention may be operated without the use of fire walls, if desired.

Figure 6A:
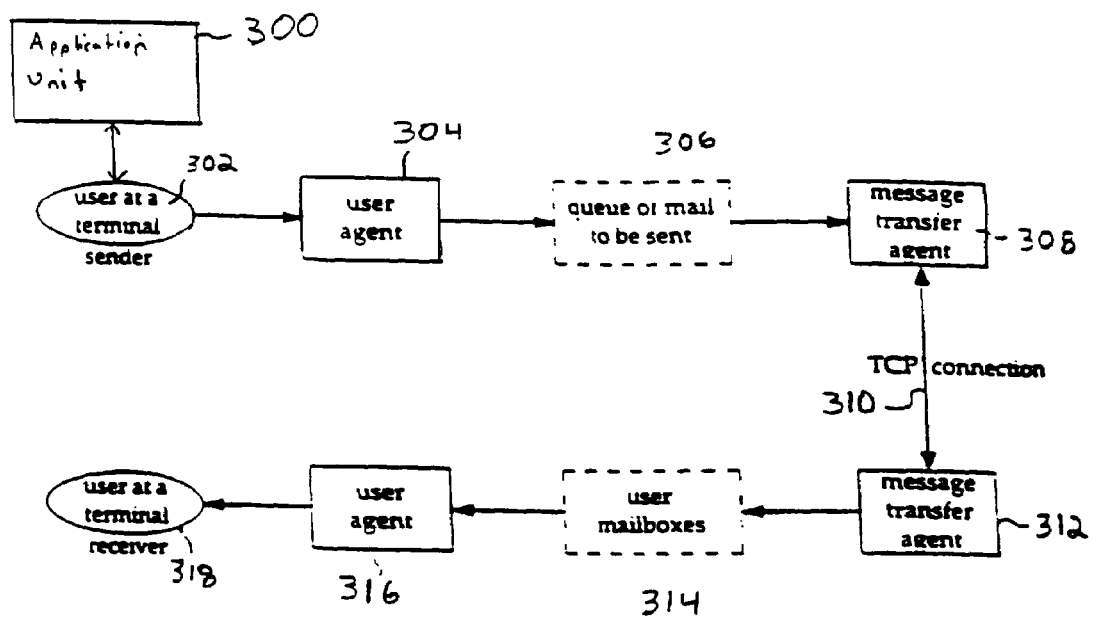
FIG. 6A illustrates in block diagram format a manner in which information may be communicated to or from a device using electronic mail.

FIG. 6A illustrates an application unit 300 connected to a typical email exchange system which includes components 302, 304, 306, 308, 310, 312, 314, 316, and 318 which may be implemented in a conventional manner and are taken from FIG. 28.1 of Stevens, above. The application unit 300 may be any of the devices described herein and the user at a terminal 302 may correspond to any of the illustrated computers, such as the computer 276 illustrated in FIG. 5. While FIG. 6A illustrates the user at a terminal 302 as being a sender, the sending and receiving functions may be reversed in FIG. 6A. Further, if desired, there may not be a need for having a user at the terminal. Connected to the user at a terminal 302 is the user agent 304. Popular user agents for Unix include MH, Berkeley Mail, Elm, and Mush. The user agent creates email messages to be sent and, if desired, places these messages to be sent in a queue 306. The mail to be sent is forwarded to a Message Transfer Agent (MTA) 308. A common MTA for Unix systems is Sendmail. Typically, the message transfer agents 308 and 312 exchange communications using a TCP (Transfer Communication Protocol) connection or a TCP/IP (Internet Protocol) connection or protocol. It is to be noted that the communication between the message transfer agents 308 and 312 may occur over the Internet, but alternatively may occur over any type of connection including any network connection such as a local area network, wide area network and/or an intranet. Further, any desired connection between the message transfer agents 308 and 312 may be utilized.

From the message transfer agents 312, email messages are stored in user mailboxes 314 which are transferred to the user agent 316 and ultimately transmitted to the user at a terminal 318 which functions as a receiving terminal.

The TCP provides a connection-mode of transmission. However, a direct connection is usually not established between the sending terminal 302 and receiving terminal 318. Thus, the transmission of an electronic mail message may be considered a connectionless-mode of communication when it is being referred to as between two users or terminals, but when considering the transfer between MTAs, the communication is usually a connection-mode of communication.

As the Internet is a network accessible by many people and organizations, it is not considered to be secure. Therefore, messages transmitted over the Internet should be encrypted to keep the messages confidential. Encryption mechanisms are known and commercially available which may be used with the present invention. For example, a C library function, crypto, is available from Sun Microcomputers for use with the Unix operating system, and other encryption and decryption routines are known and commercially available and may also be used with this invention.

Figure 6B:
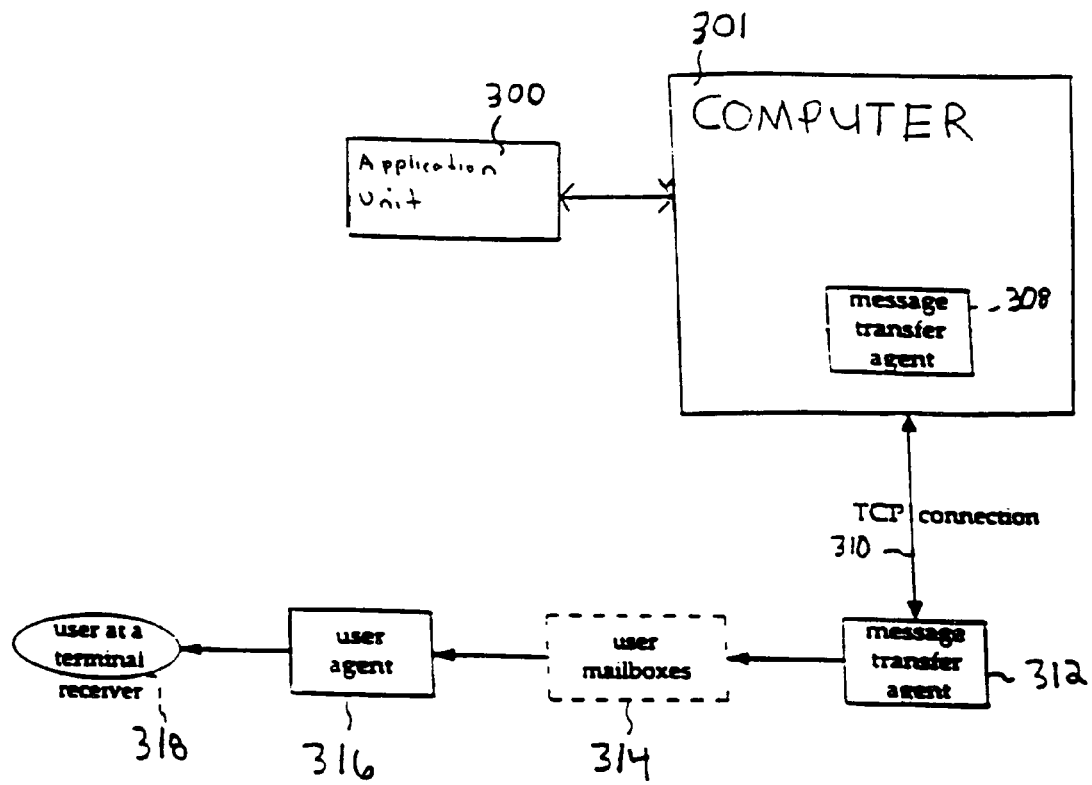
FIG. 6B illustrates an alternative way of communicating using electronic mail in which the computer which is connected to the device also serves as a message transfer agent.

As an alternative to the general structure of FIG. 6A, a single computer may be used which functions as the user terminal, and also the message transfer agent. As illustrated in FIG. 6B, the application unit 300 is connected to a computer 301 which includes the message transfer agent 308. If desired, the other components on the sending side of FIG. 6A may be included in the computer 301 of FIG. 6B including the user agent 304 and the queue of mail to be sent 306.

Figure 6C:
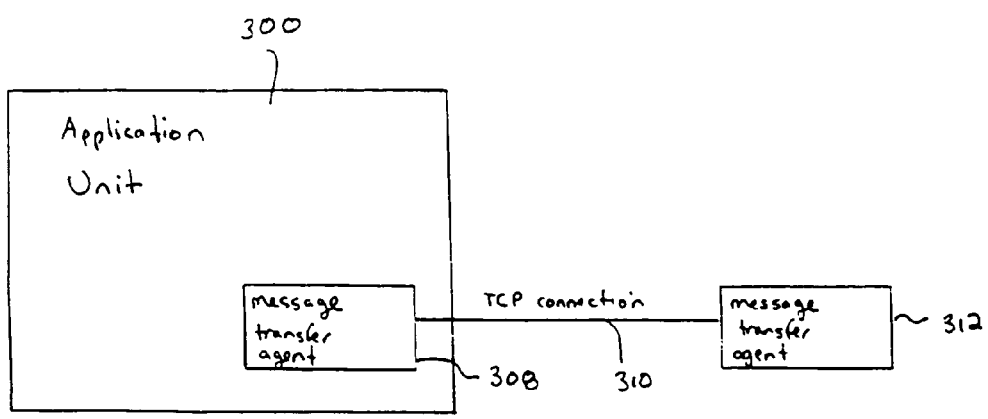
FIG. 6C illustrates an alternative way of communicating using electronic mail in which an application unit includes electronic mail capability.

A further alternative structure is shown in FIG. 6C in which the message transfer agent 308 is formed as part of the application unit 300. Further, the message transfer agent 308 is connected to the message transfer agent 312 by the TCP connection 310. This embodiment of FIG. 6C illustrates a case in which the application unit 300 is directly connected to the TCP connection 310 and has an email capability. A common instance of this embodiment of FIG. 6C may be the application unit 300 is a facsimile machine with an email capability of RFC 2305 (a simple mode of facsimile using Internet mail).

Figure 7:
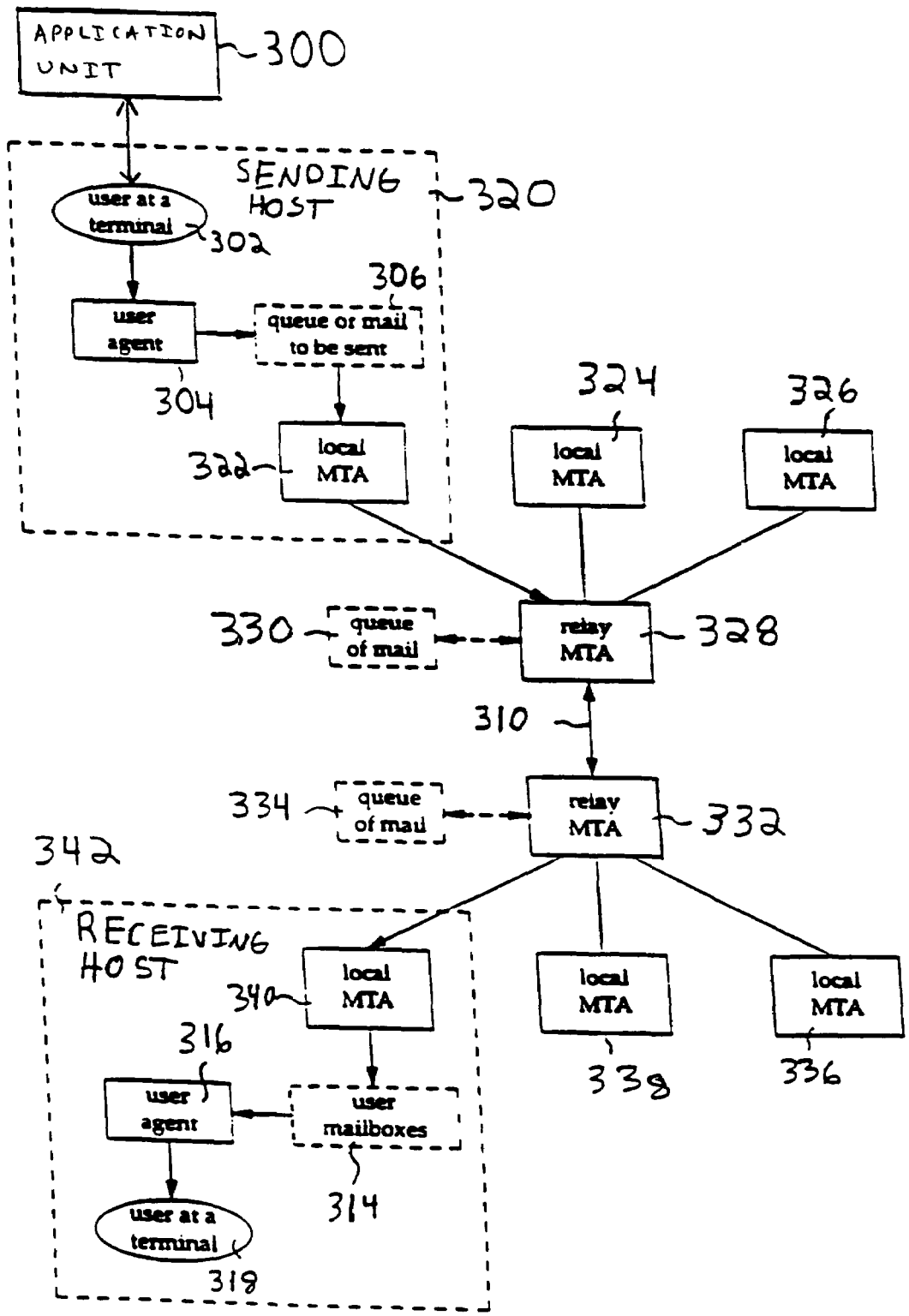
FIG. 7 illustrates an alternative manner of sending messages across the Internet.

FIG. 7 illustrates an alternative implementation of transferring mail and is based on FIG. 28.3 of Stevens. FIG. 7 illustrates an electronic mail system having a relay system at each end. The arrangement of FIG. 7 allows one system at an organization to act as a mail hub. In FIG. 7, there are four MTAs connected between the two user agents 304 and 316. These MTAs include local MTA 322, relay MTA 328, relay MTA 332, and local MTA 340. The most common protocol used for mail messages is SMTP (Simple Mail Transfer Protocol) which may be used with this invention, although any desired mail protocol may be utilized. In FIG. 7, 320 designates a sending host which includes the user at a terminal 302, the user agent 304, and the local MTA 322. The application unit 300 is connected to, or alternatively included within, the sending host 320. As another case, the application unit 300 and host 320 can be in one machine where the host capability is built into the application unit 300. Other local MTAs include local MTA 324 and 326. Mail to be transmitted and received may be queued in a queue of mail 330 of the relay MTA 328. The messages are transferred across the TCP connection 310, which may be, for example, the Internet, or may be any other type of network or connection.

The transmitted messages are received by the relay MTA 332 and if desired, stored in a queue of mail 334. The mail is then forwarded to the local MTA 340 of a receiving host 342. The mail may be placed in one or more of the user mailboxes 314 and subsequently forwarded to the user agent 316 and finally forwarded to the user at a terminal 318. If desired, the user may not be required to be at the terminal and the mail may be directly forwarded to the terminal without user interaction. Other local MTAs at the receiving side include MTA 338 and local MTA 336 which may have their own mailboxes, user agents, and terminals.

Figure 8:
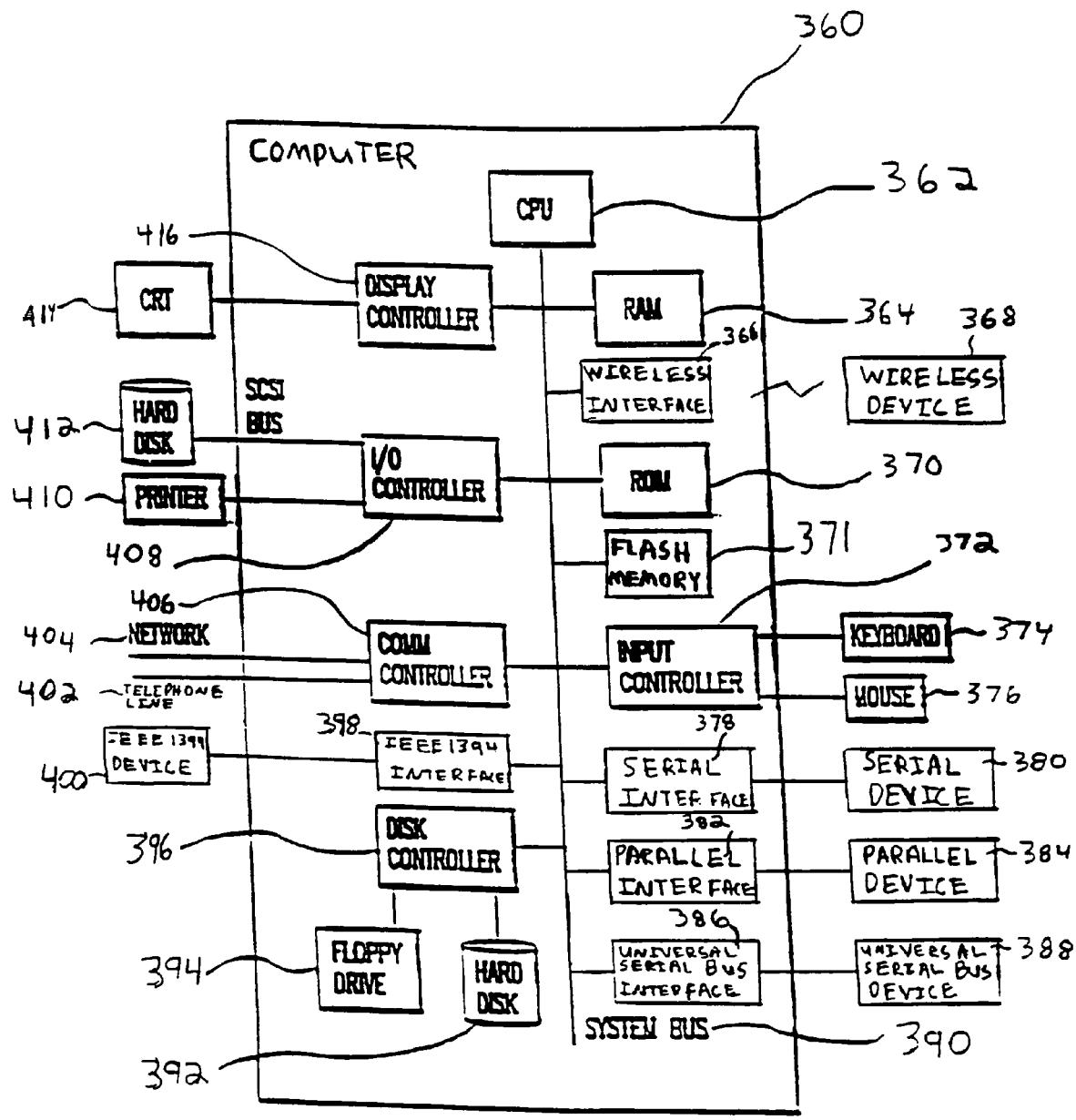
FIG. 8 illustrates an exemplary computer which may be connected to the device and used to communicate electronic mail messages.

The various computers utilized by the present invention including the computers 266 and 276, of FIG. 5 may be implemented as illustrated in FIG. 8. Further, any other computer utilized by this invention may be implemented in a similar manner to the computer illustrated in FIG. 8, if desired, including the service machine 254, computer 272, and computer 282 of FIG. 5. However, not every element illustrated in FIG. 8 is required in each of these computers. In FIG. 8, the computer 360 includes a CPU 362 which may be implemented as any type of processor including commercially available microprocessors from companies such as Intel, Motorola, Hitachi and NEC, for example. There is a working memory such as a RAM 364, and a wireless interface 366 which communicates with a wireless device 368. The communication between the interface 366 and device 368 may use any wireless medium such as radio waves, or light waves, for example. The radio waves may be implemented using a spread spectrum technique such as Code Division Multiple Access (CDA) communication or using a frequency hopping technique such as that disclosed in the Bluetooth specification.

There is a ROM 370, and a flash memory 371, although any other type of nonvolatile memory may be utilized in addition to or in place of the flash memory 371 such as an EPROM, or an EEPROM, for example. An input controller 372 has connected thereto a keyboard 374 and a mouse 376. There is a serial interface 378 connected to a serial device 380. Additionally, a parallel interface 382 is connected to a parallel device 384, a universal serial bus interface 386 is connected to a universal serial bus device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 406 allows the computer 360 to communicate with other computers, or send email messages, for example over a telephone line 402, or a network 404. An I/O (Input/Output) controller 408 is connected to a printer 410 and a hard disk 412, for example using a SCSI (Small Computer System Interface) bus. There is also a display controller 416 connected to a CRT (Cathode Ray Tube) 414, although any other type of display may be used including a liquid crystal display, a light emitting diode display, a plasma display, etc.

One feature in the present invention is to monitor usage of a target application of an application unit by a user. The term application unit in this instance refers to a system which a user interacts with and controls, and a target application is a user controlled offering of the application unit. For example, an application unit may typically be a computer and a target application may then be a software program, e.g. a word processor, running on the computer which a user operates, for example by moving a pointer on a computer screen and "clicking" on certain command icons to cause the software program to perform certain functions. In this sense, an application unit in the present invention can refer to any of workstations 17, 18, 20, 22, 56, 62, 68, 74, 42 shown in FIG. 1 running a software program, the computer 301 shown in FIG. 6B running a software program, etc. An application unit can also refer to an image forming device such as any of the digital copier/printer 24, facsimile machine 28, and printer 32 in FIGS. 1 and 2. In this instance, each of these device application units includes a user interface, such as operation panel 174 (see FIG. 3), which a user interacts with and utilizes to control the device application unit. The present invention can monitor a user selecting controls on such an operation panel. As a further example, the application unit could also be an appliance, such as a microwave oven, with an operation panel. An application unit can also refer to any other device, including software, with which a user interacts, and in this case the target application may refer to only one feature of the software which the user interacts with.

One feature of the present invention is to monitor the user's usage of such a target application of an application unit, and to effectively communicate data of the monitored usage. This data will typically be transmitted by email by the computer 301 of FIG. 6A or 6B or the application unit 300 of FIG. 6C. This data of a user's usage of a target application of an application unit can then be utilized in many ways, for example in improving software development, in monitoring usage of a device, such as an image forming device, discovering user difficulties with appliances and software, finding most frequently used features of application units, etc.

Figure 9:
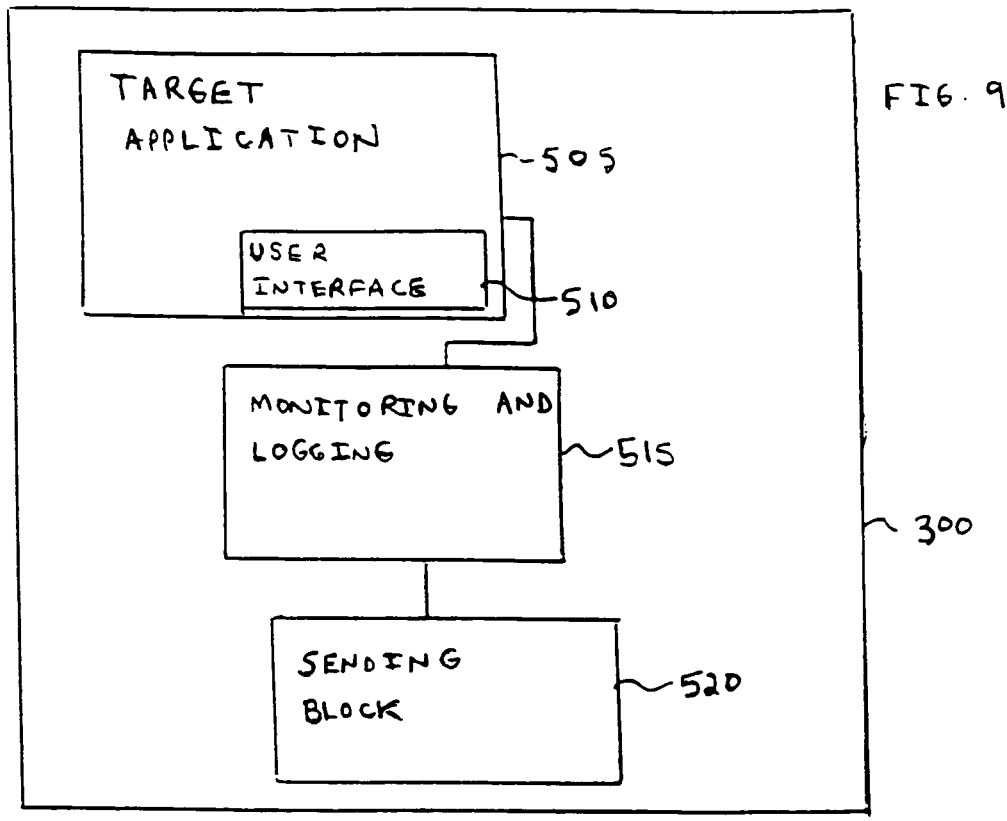
FIG. 9 shows in block diagram format a connection of a monitoring and logging block and a sending block to a target application of an application unit in the present invention.

FIG. 9 shows various elements of the present invention. More particularly, FIG. 9 shows an application unit 300 including a target application 505 which includes a user interface 510. This user interface 510 is an interface for a user to control the target application 505. As discussed above, in one common instance, the target application 505 may be a software program running on one of the workstations 17, 18, 20, 22 shown for example in FIG. 1 of the present specification. In this instance, the user interface 510 may be a display on a monitor of one of these workstations. This instance of such a target application is shown in further detail in FIG. 10 which shows a monitor 600 of one of the workstations 17, 18, 20, and 22. In this instance of a target application, a plurality of function keys 605 are displayed on the monitor 600 and the user can access these function keys by, for example, changing the positioning of a pointer with a mouse and "clicking" on one of such function keys. As a further example, if monitor 600 is a touch pad the user can control the software application unit by touching one of the function keys 605. In these instances, the present invention monitors each time a user "clicks" on or touches one of the function keys 605, and logs data of such a user usage for subsequent communication.

Figure 11:
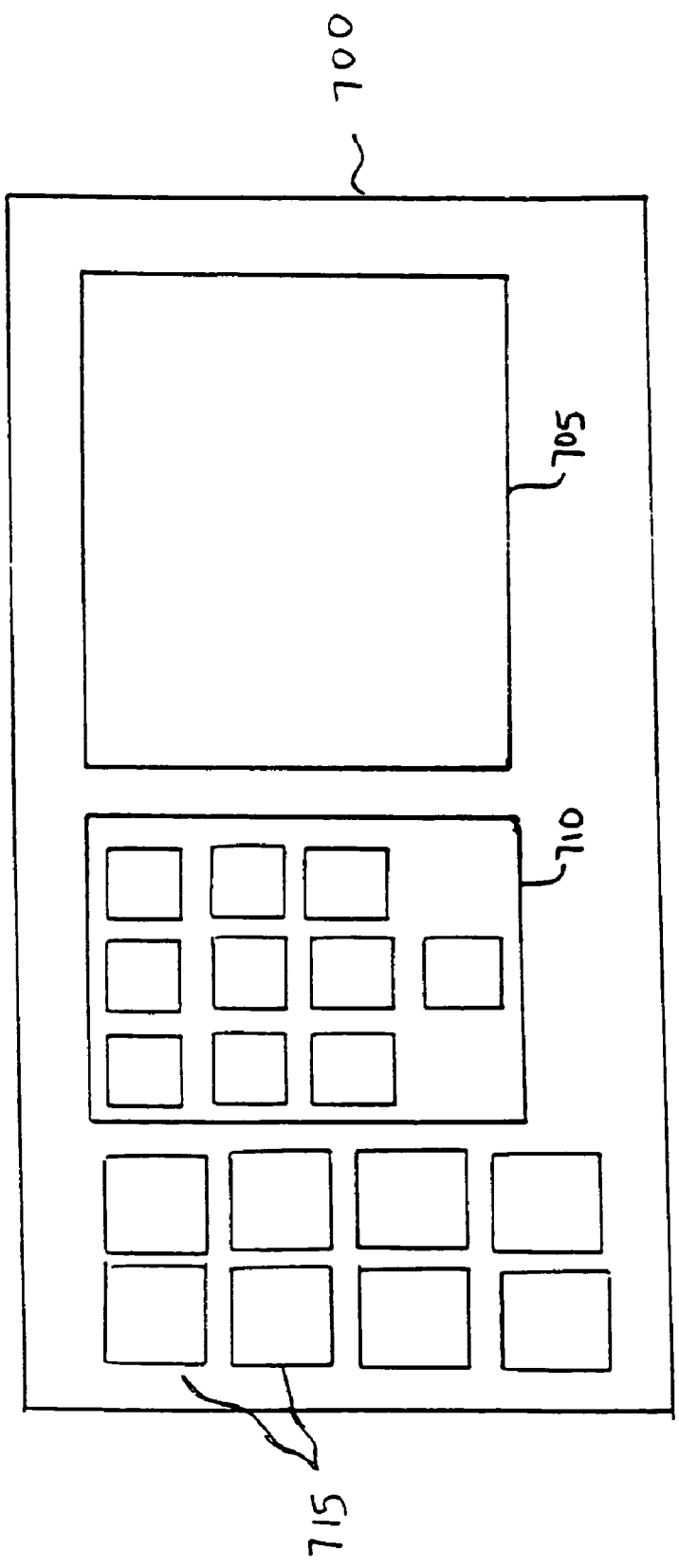
FIG. 11 shows a second example of an application unit to which the present invention can be applied.

As a further example, and as noted above, the application unit 300 may be an image forming device such as the digital copier/printer 26, facsimile machine 28, or printer 32 also shown in FIG. 1. In this instance, the user interface 510 may take the form of an operation panel (e.g. operation panel 174 in FIG. 3) with a plurality of keys and/or a touch screen which a user operates to control the image forming device. A specific example of such a user interface 510 in this instance when the application unit 300 takes the form of a digital copier printer 26, facsimile machine 28, or printer 32 is shown in FIG. 11. In this instance, the present invention monitors each time a user presses one of the control buttons on the operation panel and logs data of such a user usage for subsequent communication.

FIG. 11 shows in greater detail an example of a user interface for an image forming device. FIG. 11 shows such a user interface 700, which can, as one example, correspond to the operation panel 174 in FIG. 3. As shown in FIG. 11, such an operation panel 700 may include a touch screen 705 on which various commands may appear which an operator can select by touching different portions of the touch screen 705. The operation panel 700 may also include a 10-key pad 710 and various other control buttons 715. In the case of an image forming device, the control buttons 715 may be commands for selecting a paper size, changing a magnification, changing a darkness of a desired image, etc.

When the application unit 300 in FIG. 9 is an image forming device and the user interface 510 corresponds to the operation panel 700 as shown in FIG. 11, the present invention can monitor a user's selecting the commands shown in FIG. 11. The operation panel 700 shown in FIG. 11 may, with modifications, also be an operation panel for an appliance with which a user interfaces, such as a microwave oven, VCR, digital camera, cellular phone, palm top computer, etc.

Figure 10:
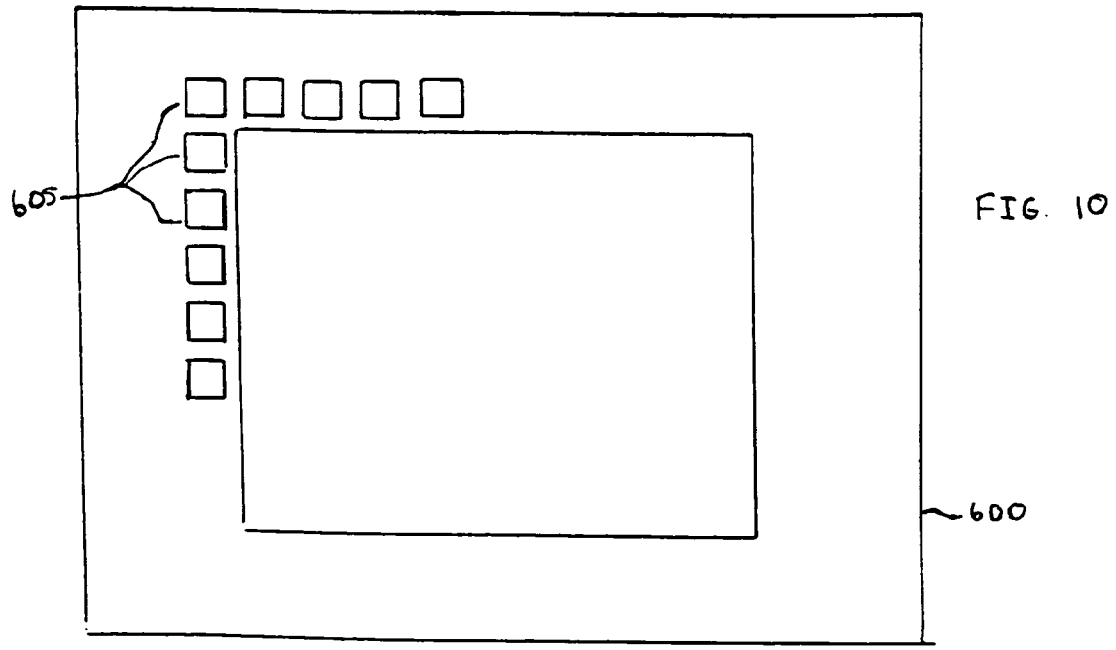
FIG. 10 shows one example of an application unit to which the present invention can be applied.

FIGS. 10 and 11 show examples of the application unit 300 and user interface 510 of FIG. 9 to which the present invention can be applied. It should be readily apparent to those of ordinary skill in the art that the present invention is directed to various types of application units including various types of user interfaces. The present invention is essentially applicable to any device which includes a user interface and for which it is desired to monitor how a user utilizes the user interface.

Returning to FIG. 9, the present invention further includes a monitoring and logging block 515 and a sending block 520. The monitoring and logging block 515 monitors the user's usage of the user interface 510 and records or logs data of such monitored usage. At a designated time, the logged data of the user's usage of the user interface 510 is then sent to the sending block 520, which then communicates such monitored usage data to a designated party. The monitoring and logging block 515 can be implemented in the device including the application unit 300 or in another system control element. The sending block can also be implemented in the device including the application unit in FIG. 6C, or can also be implemented in the computer 301 in FIG. 6B to which the application unit is attached. The present invention can also take the form of computer control codes recorded on a computer readable medium.

Figure 12A:
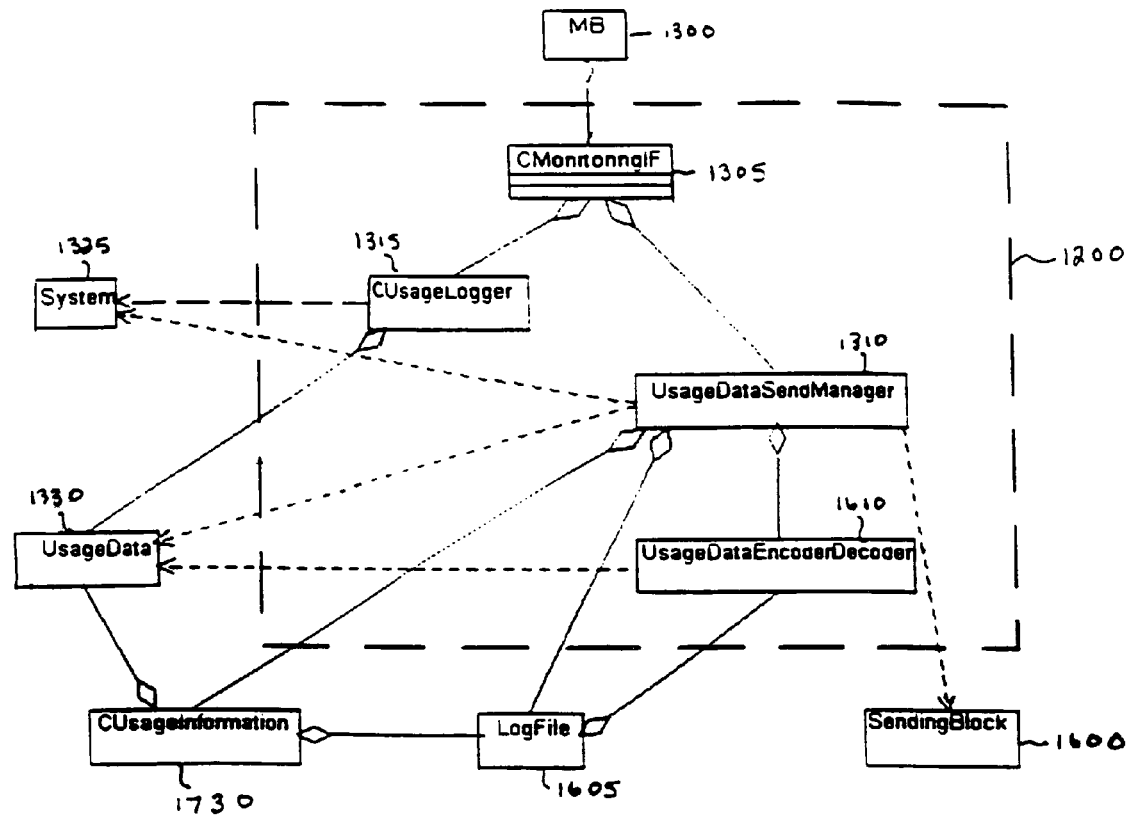
FIG. 12A shows an overall view of objects executed in the present invention.

FIG. 12A shows an overall system view of portions of the application unit 300. FIGS. 13-17 show the operations executed in the monitoring and logging block 515 and the sending block 520 shown in FIG. 9. It should be noted that FIGS. 12-17 describe the system and such operations in an object oriented format utilizing the unified modeling language such as described in "The Unified Modeling Language User Guide" by Booch et al. published by Addison-Wesley, 1999.

In FIG. 12A the object MB 1300 indicates a target application to be monitored. The dashed-block in FIG. 12A contains objects responsible for the monitoring functions, and thus collectively indicate a monitoring block object 1200. A CMonitoringIF object 1305 performs monitoring functions of the target application MB 1300. A CUsageLogger object 1315 includes functions for logging monitored data obtained by the CMonitoringIF object 1305. The CUsageLogger object 1315 interacts with a System object 1325 to obtain system information and a CUsageData object 1330 which is a storage for logged data.

A UsageDataSendManager object 1310 interacts with the CMonitoringIF object 1305. This UsageDataSendManager object 1310 controls transmitting monitored data of a user's usage of the target application MB 1300 as monitored by the CMonitoringIF object 1305. This UsageDataSendManager object 1310 interacts with a CUsageInformation object 1730, which can modify the data to be transmitted, a LogFile object 1605, which can also store data to be transmitted, and a UsageDataEncoderDecoder object 1610 which can encode and decode data to and from the LogFile object 1605. The UsageDataSendManager object 1310 also provides the data to be transmitted to the sending block object 1600.

Figure 12B:
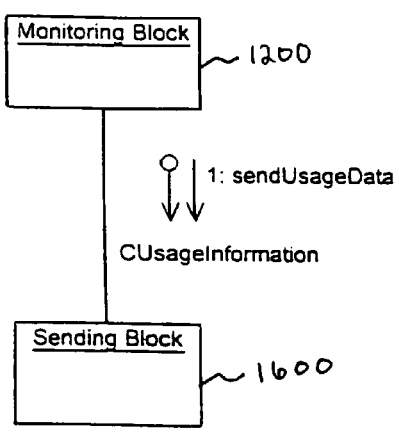
FIG. 12B shows information in an abstract class transferred between a monitoring block and a sending block in the present invention.

FIG. 12B shows an overall operation executed in the system of FIG. 12A. More particularly, as shown in FIG. 12B the monitoring block object 1200 overall calls a function send UsageData to the sending block object 1600 and provides CUsageInformation to the sending block object 1600. The CUsageInformation is information of the usage of the monitored target application 505. This operation instructs the sending block object 1600 to send the CUsageInformation provided from the monitoring block object 1200.

The operations performed by the various objects noted in FIGS. 12A and 12B are now discussed in further detail in FIGS. 13-17. In FIGS. 13-17 the various functions are preceded by a numeral and a colon. It should be noted that this nomenclature is not always indicative of the order of the various operations as various operations can be performed in parallel and at different times.

Figure 13:
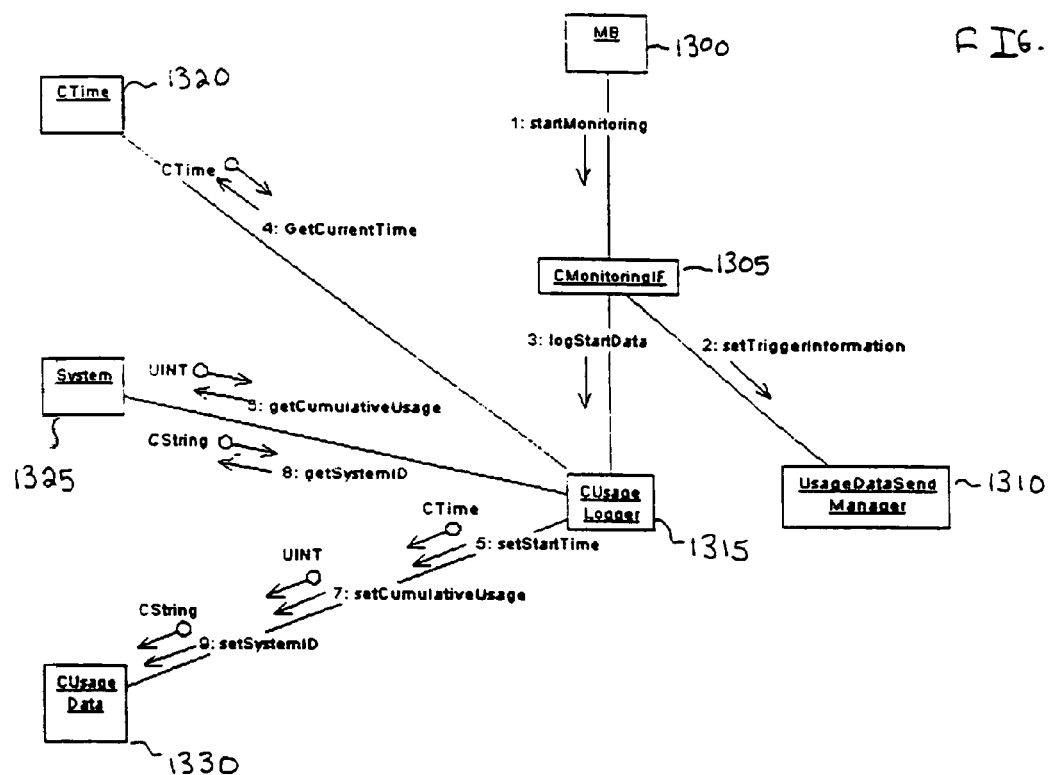
FIG. 13 shows a start monitoring operation executed in the present invention.

FIG. 13 shows a start monitoring control executed in the present invention. As shown in FIG. 13, when a target application MB starts up, the MB object 1300 calls a function startMonitoring of a CMonitoringIF object 1305. This operation indicates that the logging of data corresponding to a user's usage of a user interface 510 is to begin. The CMonitoringIF object 1305 then calls a setTriggerInformation function of a UsageDataSendManager object 1310. This operation sets trigger information indicating when logged data should be sent by the sending block 520. How this trigger information is set is discussed in further detail with reference to FIG. 14 discussed below.

Returning to FIG. 13, the CMonitoringIF object 1305 also calls a logStartData function from a CUsageLogger object 1315. This operation can be executed in parallel with calling the setTriggerInformation function of the UsageDataSendManager object 1310 or after calling the setTriggerInformation function.

The CUsageLogger object 1315 then calls a GetCurrentTime function of a CTime object 1320, and the CTime object 1320 then returns CTime data to the CUsageLogger object 1315. The returned CTime data is data of a start time of the monitoring. Thus, this operation sends data indicating the start time to the CUsageLogger object 1315, so that it can be determined at what time the user started using the user interface 510 of the target application 505 being monitored.

The CUsageLogger object 1315 then calls a setStartTime function of the CUsageData object 1330, and sends the CTime data of the start time to the CUsageData object 1330. The CUsageLogger object 1315 in a next operation calls a getCumulativeUsage function of a System object 1325 and the System object 1325 returns UINT data to the CUsageLogger object 1315. In this operation the CUsageLogger object 1315 obtains from the System object 1325 the number of times that users have used the target application to be monitored, and the System object 1325 returns an integer value of the type UINT. Thus, in this operation, when the target application 505 is utilized more than once, the CUsageLogger object 1315 is updated to reflect this multiple usage.

The CUsageLogger object 1315 then calls a setCumulativeUsage function and sends the UINT data to the CUsageData object 1330 after incrementing the value. The CUsageLogger object 1315 also calls a getSystemID function of the System object 1325, and the System object 1325 then returns the CString data to the CUsageLogger 1315 which indicates the system identification. The system identification identifies the environment under which the target application 505 is running. The purpose of this identification is to sort out usage data from different systems. The CUsageLogger object 1315 also calls the setSystemID function of the CUsageData object 1330 and sends the CString data indicating the system identification to the CUsageData object 1330.

Figure 14:
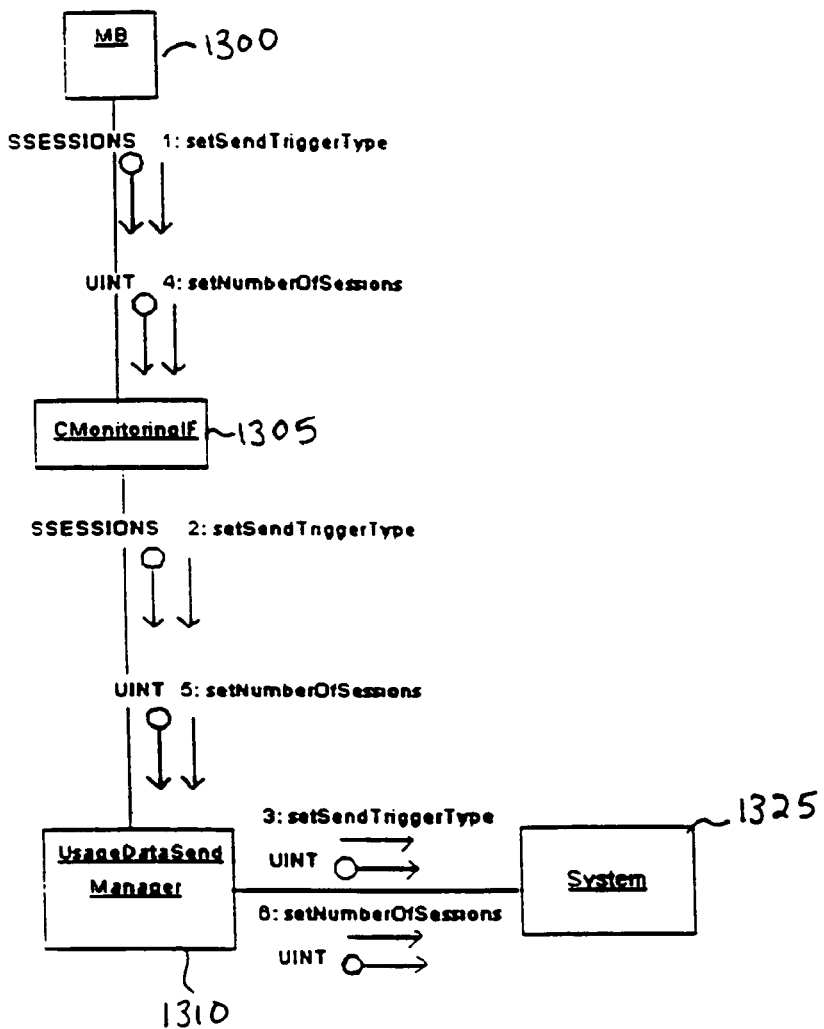
FIG. 14 shows an operation of setting a trigger type and a number of sessions operations in the present invention.

FIG. 14 shows a specific control operation of setting the trigger type. The trigger type indicates when logged data of a monitored usage of a user interface 510 is to be sent from the sending block 520. More particularly, and as noted above, in the present invention a user's usage of the user interface 510 can be monitored. In this instance, the monitored data can be sent by the sending block 520 at various times. One operation is to send the monitored usage data by the sending block 520 after every time the user exits the target application 505. For example, if the target application 505 is a software that the user is running, every time that the user clicks on or touches an exit function, the monitored and logged data is sent by the sending block 520. As an alternative, the user can perform a setting so that the monitored usage data is sent by the sending block 520 only after a predetermined number of sessions of utilizing the target application 505. For example, the user can perform a setting, or a default operation can perform a setting, so that only after the user utilizes the target application 505 5 times does the sending block 520 send the monitored usage data. FIG. 14 shows the control operation of setting the trigger function.

In FIG. 14, the MB object 1300 calls a setSendTriggerType function of the CMonitoringIF object 1305, and the CMonitoringIF object 1305 in turn calls a setSendTriggerType function of the UsageDataSendManager object 1310. The UsageDataSendManager object 1310 then calls a setSendTriggerType function of the System object 1325 and provides the System object 1325 with the UINT data. The UINT data in this instance is data indicating the trigger type to send the monitored usage data to the sending block 520 after a predetermined number of sessions utilizing the target application 505. This operation performed by these steps in the present invention thereby sets a trigger type such that after a predetermined number of sessions of the target application 505 by a user, a trigger is sent to the sending block 520 to send the monitored and logged data to a designated location.

As noted above, as a further operation of the present invention the MB object 1300 can set, or a default setting may be executed to set, a number of sessions to be executed prior to issuing a trigger to the sending block 520. As an example, the MB object 1300 can issue a setting for sending the monitored and logged data after using a target application every 5 times. In this operation, after executing the operations noted above to set the send trigger type to be after multiple sessions, the MB object 1300 further calls a setNumberOfSessions function of the CMonitoringIF object 1305, which in turn calls a setNumberOfSessions of and sends the UINT data to the UsageDataSendManager object 1310, which in turn calls a setNumberOfSessions function of and sends the UINT data to the System object 1325. In this instance, the UINT data indicates the MB object's setting or the default setting of the number of sessions to be executed prior to sending the trigger to the sending block 520. The System object 1325 thus stores the UINT data which indicates how many sessions must be executed prior to sending a trigger.

Figure 15A:
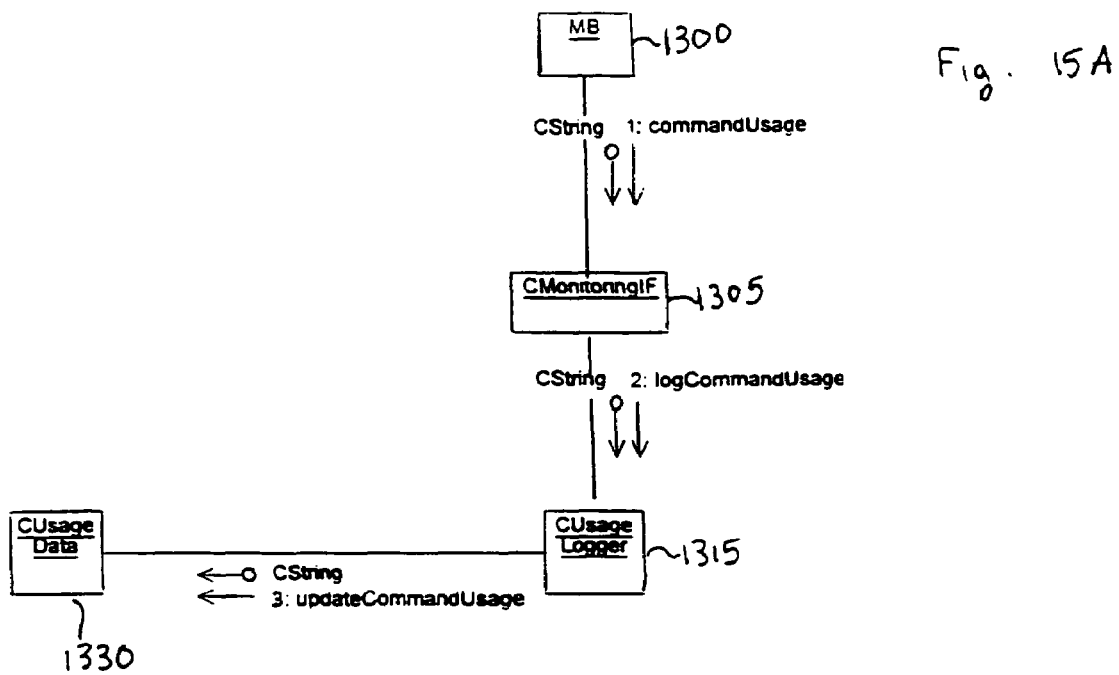
FIGS. 15(a) and 15(b) show command usage operations which can be executed in the present invention.
Figure 15B:
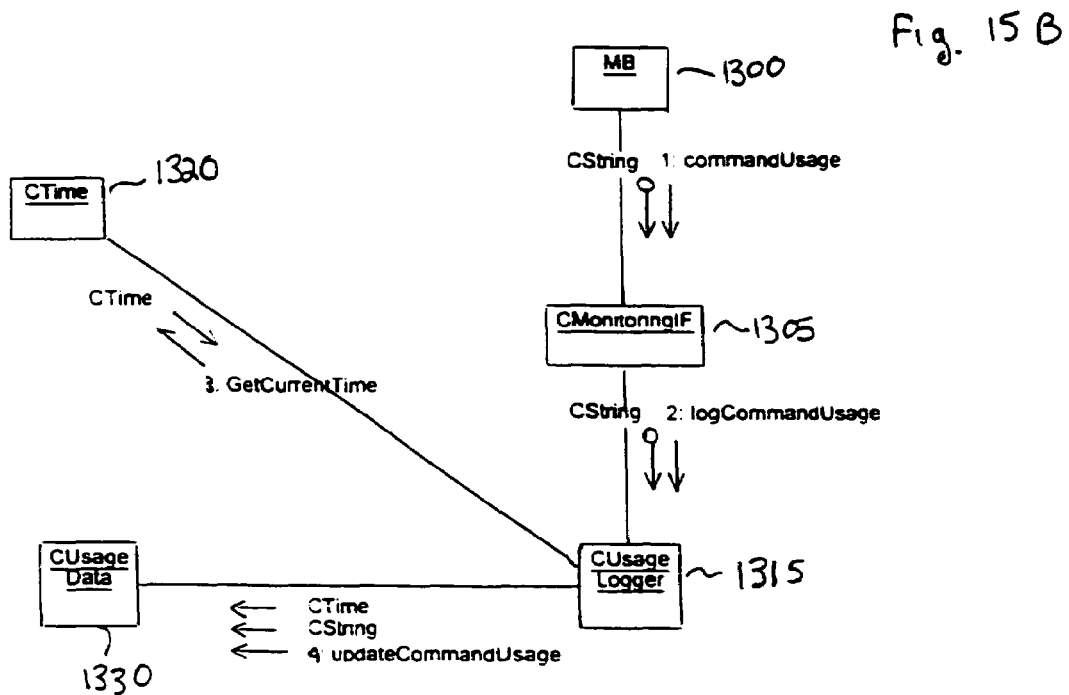

FIGS. 15A and 15B show scenarios of monitoring functions of the target application 505 that are called when the user uses the user interface 510. That is, these figures show the actual monitoring and logging operations executed in the present invention when, as examples, a user "clicks" on a command in a software application as the target application or presses a button on an operation panel of an appliance, image forming device, etc.

In FIG. 15A, when a user selects a particular command from the user interface 510 of the target application 505 being monitored, the MB object 1300 calls a commandUsage function of and sends CString data, indicating the name of the command or function on the user interface 510 selected by the user, to the CMonitoringIF object 1305. The CMonitoringIF object 1305 then calls a logCommandUsage function of and sends the CString data to the CUsageLogger object 1315. This function indicates to the CUsageLogger object 1315 to log (store) data of the command or function on the user interface 510 selected by the user. The CUsageLogger object 1315 then sends the CString data to and calls an updateCommandUsage function of the CUsageData object 1330. The CUsageData object 1330 then stores the name of the selected and monitored command or function with a frequency of one if the name does not exist, i.e. if the name has not been previously selected and then stored, or increments the frequency associated with the name if the name exists, i.e. if the name has been previously selected and then stored.

The command usage scenario in FIG. 15B is identical to that as in FIG. 15A except that the CUsageLogger object 1315 also calls a GetCurrentTime function of the CTime object 1320, and in response the CTime object 1320 sends CTime data, which indicates a current time, to the CUsageLogger object 1315. The CTime data is then also sent to the CUsageData object 1330. In this operation in FIG. 15B, in addition to recording which command of the user interface 510 of the target application 505 being monitored has been selected by a user, the time that such a command is selected is also recorded.

That is, in the operation in FIG. 15A the only data recorded is that of the command of the user interface 510 selected by the user, whereas the command usage operation of FIG. 15B additionally records data of the time that such a command on the user interface 510 was selected by the user.

Figure 16A:
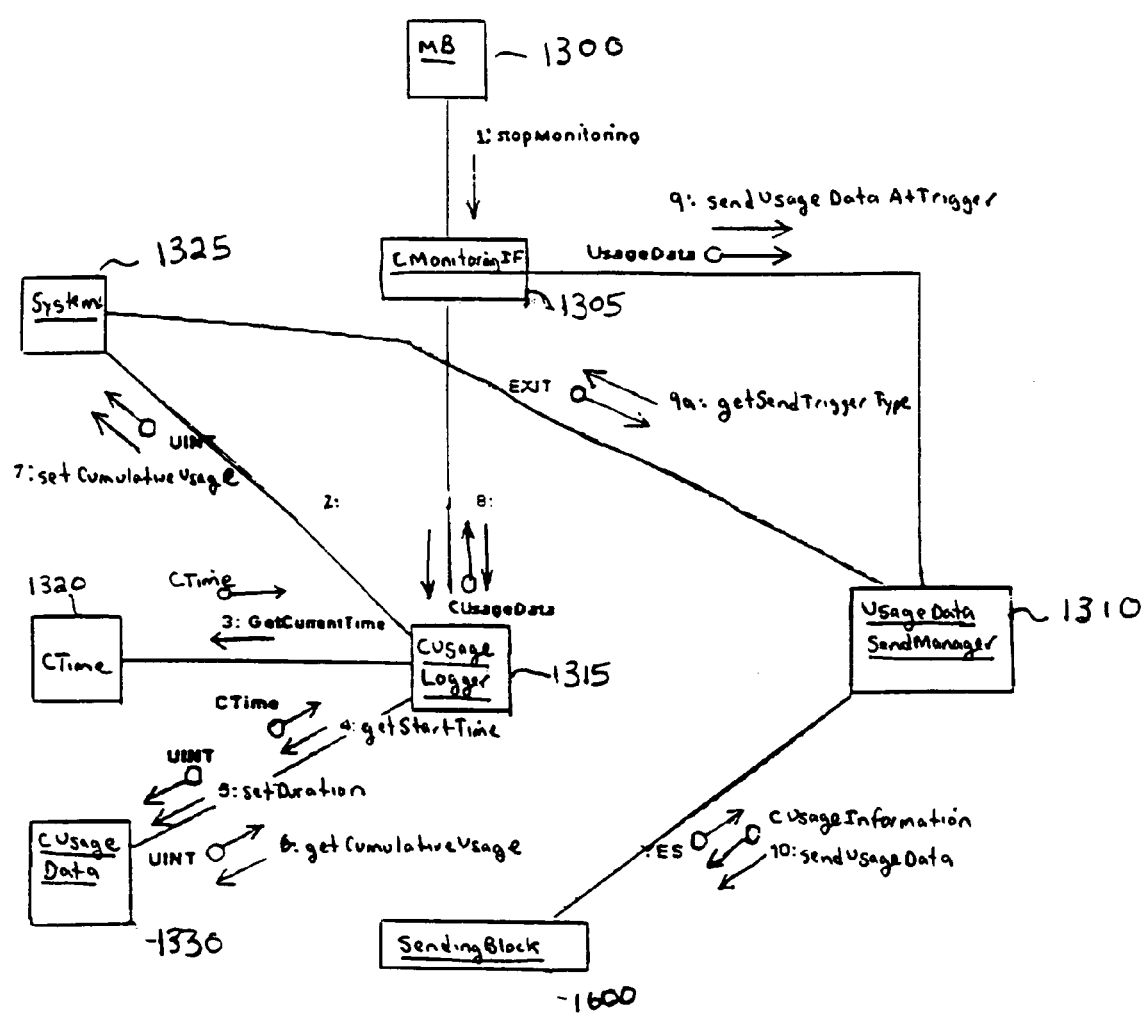

FIGS. 16A and 16B show operations of stopping monitoring of the user's usage of the user interface 510. Monitoring of the user's usage of the user interface 510 can be stopped when the user exits the target application 505. For example, when the target application 505 is software running on a workstation, the monitoring can be stopped when the user exits a program being executed. When the target application 505 is an operation panel of an appliance, an image forming device, etc., the monitoring can be stopped when a particular icon/button, such as a start button of a copier, is pressed. The monitoring can also be stopped after a predetermined period of time, after a predetermined period of time during which the user does not use the target application, etc. Similar conditions for stopping monitoring of user's usage of the user interface 510 can be executed when the target application 505 is an image forming device such as a copy machine, facsimile machine, printer, scanner or an appliance such as a microwave oven, VCR, digital camera, cellular phone, palm top computer, etc. Again, in such circumstances the monitoring can be stopped when the user inputs an exit command, after a predetermined time, after a predetermined time of non-usage, etc.

In FIG. 16A, when the user is exiting from the MB object 1300, the MB object 1300 initially calls a stopMonitoring function of the CMonitoringIF object 1305. The CMonitoringIF object 1305 then calls a logStopData function of the CUsageLogger object 1315 so that the CUsageLogger object 1315 can stop recording-data of usage of the user interface 510 by the user. The CUsageLogger object 1315 then calls a GetCurrentTime function of the CTime object 1320, and the CTime object 1320 then returns CTime data to the CUsageLogger object 1315 indicating the current time. This current time indicates a time that monitoring of the user's usage of the interface 510 has been stopped. The CUsageLogger object 1315 then calls a getStartTime function of the CUsageData object 1330, which then returns CTime data indicating the stored time that the monitoring was started. After these operations, the CUsageLogger object 1315 will have data of the start time of the monitoring and the current time of stopping the monitoring. Thereby, the CUsageLogger object 1315 can determine the duration of time that the user's usage of the user interface 510 has been monitored. The CUsageLogger object 1315 then calls a setDuration function of the CUsageData object 1330 and sends UINT data with this setDuration function; that is, in this instance, the UINT data indicates the duration of time that the user's usage of the user interface 510 has been monitored. The CUsageLogger object 1315 also calls a getCumulativeUsage function of the CUsageData object 1330 which then returns the requested data as UINT data. The CUsageLogger object 1315 then sends this UINT data to and calls the setCumulativeUsage function of the System object 1325, so that the next time the monitoring operation is executed, the value of how many monitoring sessions have been executed is one more than the current execution.

The CMonitoringIF object 1305 also calls a getUsageData function of the CUsageLogger object 1315, which in turn returns the CUsageData to the CMonitoringIF object 1305. This data includes all the stored monitoring data including the system ID, cumulative usage, start time, usage duration, commands and frequencies. The CMonitoringIF object 1305 then sends the CUsageData with a call for a sendUsageDataAtTrigger function of the UsageDataSendManager object 1310. The UsageDataSendManager object 1310 then calls a getSendTriggerType function of the System object 1325, which then returns EXIT data to the UsageDataSendManager object 1310. The returned value EXIT means that the monitored data is sent to the sending block object 1600 every time the user exits the target application. The UsageDataSendManager object 1310 then sends the CUsageInformation, indicating all of the usage data of the user's usage of the user interface 510, through a sendUsageData function of the sending block object 1600. The sending block object 1600 then performs a function for sending the data to a designated party and then returns a confirmation signal, YES, to the UsageDataSendManager object 1310.

This operation shown in FIG. 16A corresponds to an operation in which the usage data is sent based on a triggering event of a user exiting a target application 505.

The stop monitoring operation indicated in FIG. 16B is similar to that as shown in FIG. 16A except in this operation the usage data is sent by the sending block object 1600 after a predetermined number of sessions. As discussed above, as one feature in the present invention the monitored usage data can be sent by email after a certain number of sessions of a user using the target application 505. The operation shown in FIG. 16B corresponds to sending the usage data after such a certain number of sessions. The operations 1-9 performed in FIG. 16B are the same as performed in FIG. 16A, and their redundant description thereof is not repeated herewith. In the stop monitoring operation shown in FIG. 16B, after calling the getSendTriggerType function of the System object 1325 and returning SSESSION, the UsageDataSendManager object 1310 also calls a getNumberOfSessions function of the System object 1325. This operation obtains the data previously set by a user indicating the number of sessions which must be finished prior to sending the monitored data in this operation. As shown in FIG. 14, the number of sessions can be set in the System object 1325. The System object 1325 then returns UINT data, indicating the number of sessions after which data should be sent, to the UsageDataSendManager object 1310. The UsageDataSendManager object 1310 then sends the CUsageData and a call for a storeUsageData function of a LogFile object 1605. In this instance, if the predetermined set number of sessions has not been executed, the data from a session is stored in a non-volatile memory by the LogFile object 1605. The LogFile object 1605 then sends the CUsageData and a log file along with a call for an encodeUsageData function to a UsageDataEncoderDecoder object 1610. This operation encodes such data, for example compresses such data for easier storage, and stores the encoded usage data in the log file. When the appropriate number of sessions are completed, then the UsageDataSendManager object 1310 sends the CUsageInformation along with a call for a sendUsageData function to the sending block object 1600, which then sends the data and returns a confirmation data, YES, to the UsageDataSendManager object 1310.

Figure 17:
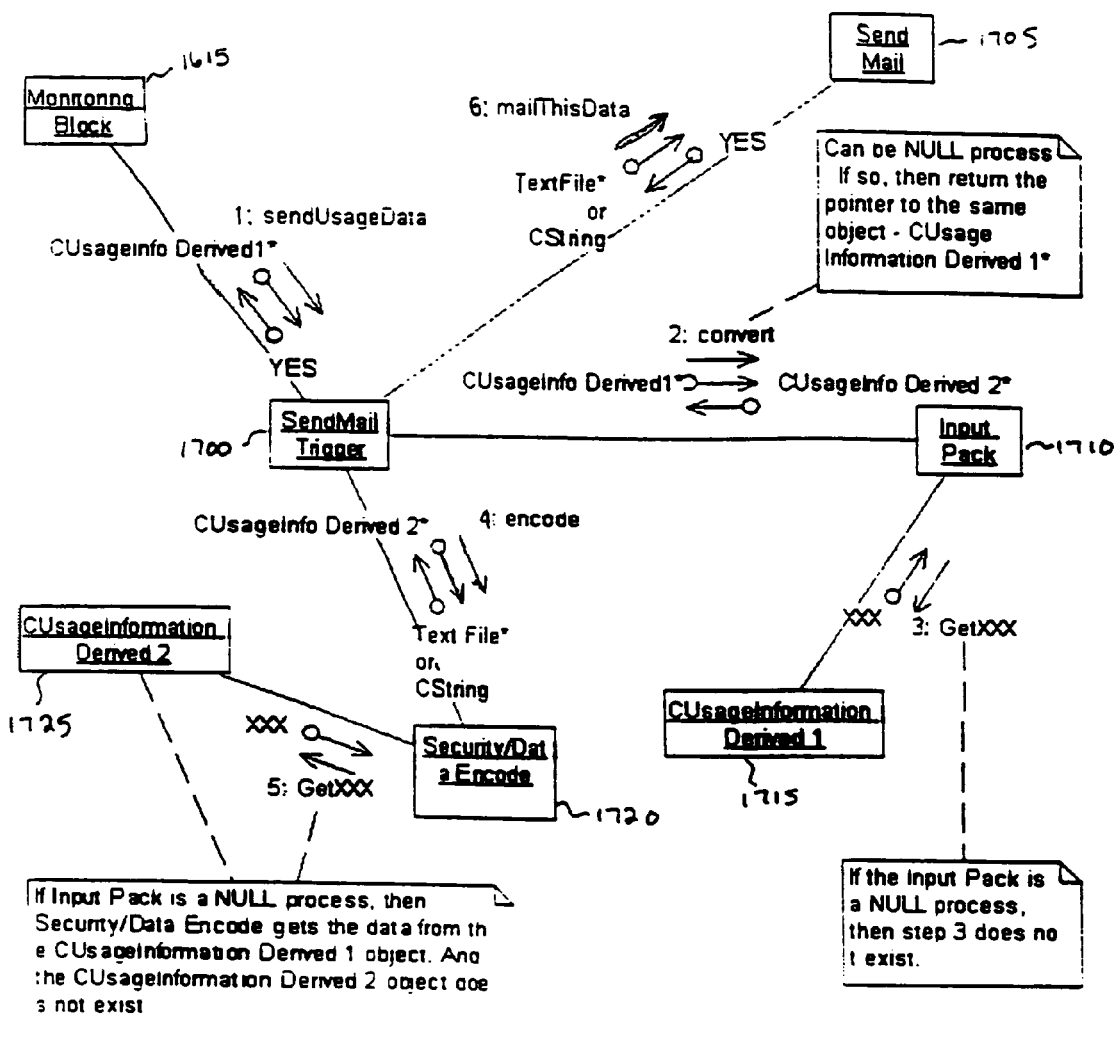
FIG. 17 shows a sending control operation which can be executed in the present invention.

FIG. 17 shows the operations performed in the SendingBlock object 1600 of FIGS. 16A and 16B.

The step with nomenclature 1 shown in FIG. 17 corresponds to the step with nomenclature 10 shown in FIG. 16A and the step with nomenclature 12 shown in FIG. 16B. In this step the MonitoringBlock object 1615 calls a sendUsageData function of and sends CUsageInformationDerived1 data to a SendMailTrigger object 1700. The SendMailTrigger object 1700 also returns a confirmation signal YES to the MonitoringBlock object 1615 after sending out the information. The SendMailTrigger object 1700 then sends CUsageInformationDerived1 data to and calls a convert function of the InputPack object 1710. The InputPack object 1710 can then convert the CUsageInformationDerived1 data into a different format data CUsageInformationDerived2. This CUsageInformationDerived2 data is then sent to the SendMailTrigger object 1700. The reason for this conversion is to accommodate any different data formats that may be passed from the monitoring block to the sending block according to different sending triggers. After the conversion, the data format will be the same within the sending block object 1600.

The InputPack object 1710 then calls a GetXXX function of a CUsageInformationDerived1 object 1715. The CUsageInformationDerived1 object 1715 then returns the requested XXX data to the InputPack object 1710. Examples of the data referenced by the XXX are system ID, cumulative usage, start time, duration, and command usage data.

The SendMailTrigger object 1700 then sends the data CUsageInformationDerived2 to and calls an encode function of the Security/DataEncode object 1720. The Security/DataEncode object 1720 then encodes the CUsageInformationDerived2 data and returns text file or CString data to the SendMailTrigger object 1700; that is the text file or CString data is security encoded data returned to the SendMailTrigger object 1700. This operation in the present invention can encrypt the usage data prior to being sent out by the email to ensure security.

The Security/DataEncode object 1720 then calls a GetXXX function from a CUsageInformationDerived2 object 1725, which in response returns the requested XXX data to the Security/DataEncode object 1720 as done at the step with nomenclature 3.

The sendMailTrigger 1700 then sends the text file or CString of the encoded and encrypted data to a SendMail object 1705, along with a call of a mailThisData function. The SendMail object 1705 then sends the encrypted data and then returns a confirmation signal, YES, indicating that the SendMail object 1705 has sent the data, to the SendMailTrigger object 1700.

As noted above with reference to FIG. 12B, in the present invention the monitoring block object 1200 calls a send UsageData function of the sending block object 1600 and sends the CUsageInformation to the sending block object 1600. That CUsageInformation can vary significantly. More particularly, and as noted above, the information sent from the monitoring block object 1200 to the sending block object 1600 depends on the different trigger information and different information as to the number of sessions of the target application 505 to be executed prior to sending information from the sending block object 1600. A result of this is that there are variations in the size of the data and the structure of the data to be sent by the sending block object 1600. As an example, in one feature of the present invention as discussed above, the monitored data generated from the monitoring block object 1200 can be sent by the sending block object 1600 after each usage of a monitored target application 505. As another option, the monitored data can be sent by the sending block object 1600 after a certain number of sessions, for example five sessions, of the monitored target application 505 have been executed. In those two different instances, the amount of data and the structure of the data to be sent by the sending block object 1600 will vary significantly.

One option to address the different data sent from the monitoring block object 1200 is to provide different algorithms within the sending block object 1600 for each different type of data. However, that type of system would result in the sending block object 1600 becoming very complicated in requiring algorithms to address all the different forms of the data provided from the monitoring block object 1200. A further drawback with the sending block object 1600 addressing the different forms of the data is that the algorithms in the sending block object 1600 would have to be updated every time a change was made in the monitoring operation of the monitoring block object 1200.

One further feature of the present invention is to make the sending block object 1600 transparent to the differences in data output from the monitoring block object 1200.

That is, as a further feature the present invention may further utilize an approach which avoids requiring complicated algorithms which would require significant updating in the sending block object 1600 to address all the different data sizes and structures output from the monitoring block object 1200. More particularly, the present invention may further utilize a system which defines an abstract class to interface between the monitoring block object 1200 and the sending block object 1600. This operation in the present invention allows the sending block object 1600 to be isolated from the details of the CUsageInformation sent from the monitoring block object 1200. That is, with this approach in the present invention the sending block object 1600 treats all of the CUsageInformation sent from the monitoring block 1200 the same, and does not have to determine how the data is represented and how much data is included in the CUsageInformation, i.e., how many sessions of data are included therein, the data structure, etc. Even more particularly, in the present invention as shown in FIG. 12B the CUsageInformation passed from the monitoring block object 1200 to the sending block object 1600 is an abstract class.

Figure 18:
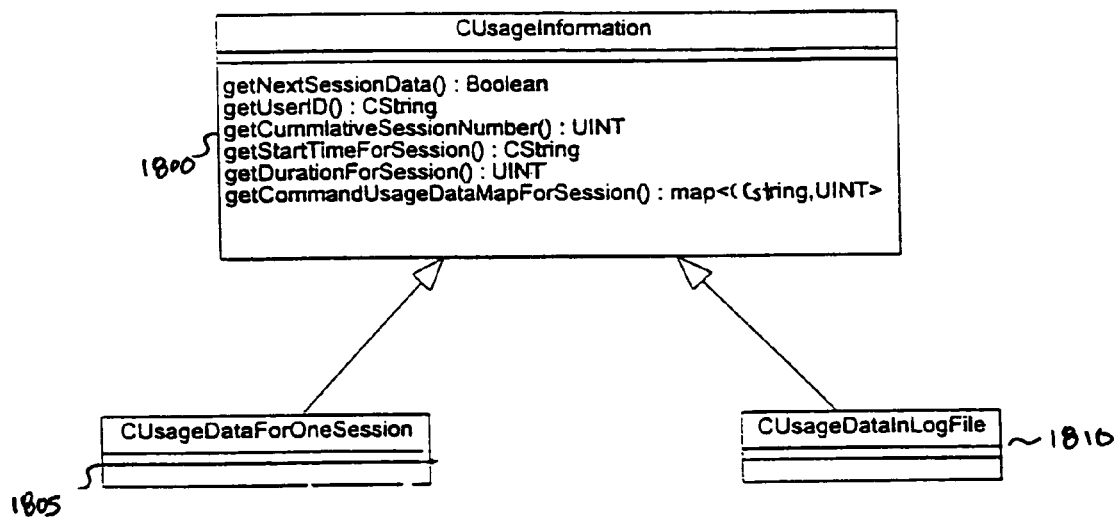
FIG. 18 shows a structure of abstract and derived classes in the present invention.

FIG. 18 shows a class diagram of the abstract class CUsageInformation 1800 of FIG. 12B. This abstract class CUsageInformation 1800 is used to derive two classes, CUsageDataForOneSession 1805 and CUsageDataInLogFile 1810. The functions listed in the CUsageInformation abstract class 1800 in FIG. 18 are pure virtual functions. This means that when the pointer of the sendUsageData call of FIG. 12B points to the abstract class CUsageInformation 1800, and more particularly points to one of the derived classes CUsageDataForOneSession 1805 or CUsageDataInLogFile 1810, the actual functions to be executed are the functions defined in those corresponding classes. Further details of utilizing an abstract class can also be found in the book The C++ Programming Language, Third Edition, by Bjarne Stroustrup, Addison Wesley, 1997, pages 34-37, the contents of this entire book being incorporated herein by reference.

The derived class CUsageDataForOneSession 1805 is a derived class which results in the sending block object 1600 sending the monitored information after each session of the target application 505, i.e., after each time a user exits the monitored target application 505. The CUsageDataInLogFile 1810 is a derived class which results in the sending block object 1600 sending the monitored information of several sessions, for example five sessions, of monitored usage at one time.

As shown in FIG. 18, the CUsageInformation abstract class 1800 includes different functions which vary based on the derived class. The functions include getNextSessionData, getUserID, getCumulativeSessionNumber, getStartTimeForSession, getDurationForSession, getCommandUsageDataMapForSession. FIG. 18 also shows the declarations of those functions.

The functions noted above in the abstract class CUsageInformation 1800 are all virtual functions which are initially set to zero, which makes them pure virtual functions. What the functions do is not defined by the abstract class CUsageInformation 1800, but by the derived classes CUsageDataForOneSession 1805 and CUsageDataInLogFile 1810. That is, the derived classes CUsageDataForOneSession 1805 and CUsageDataInLogFile 1810 describe the behavior of the functions noted above.

Figure 19:
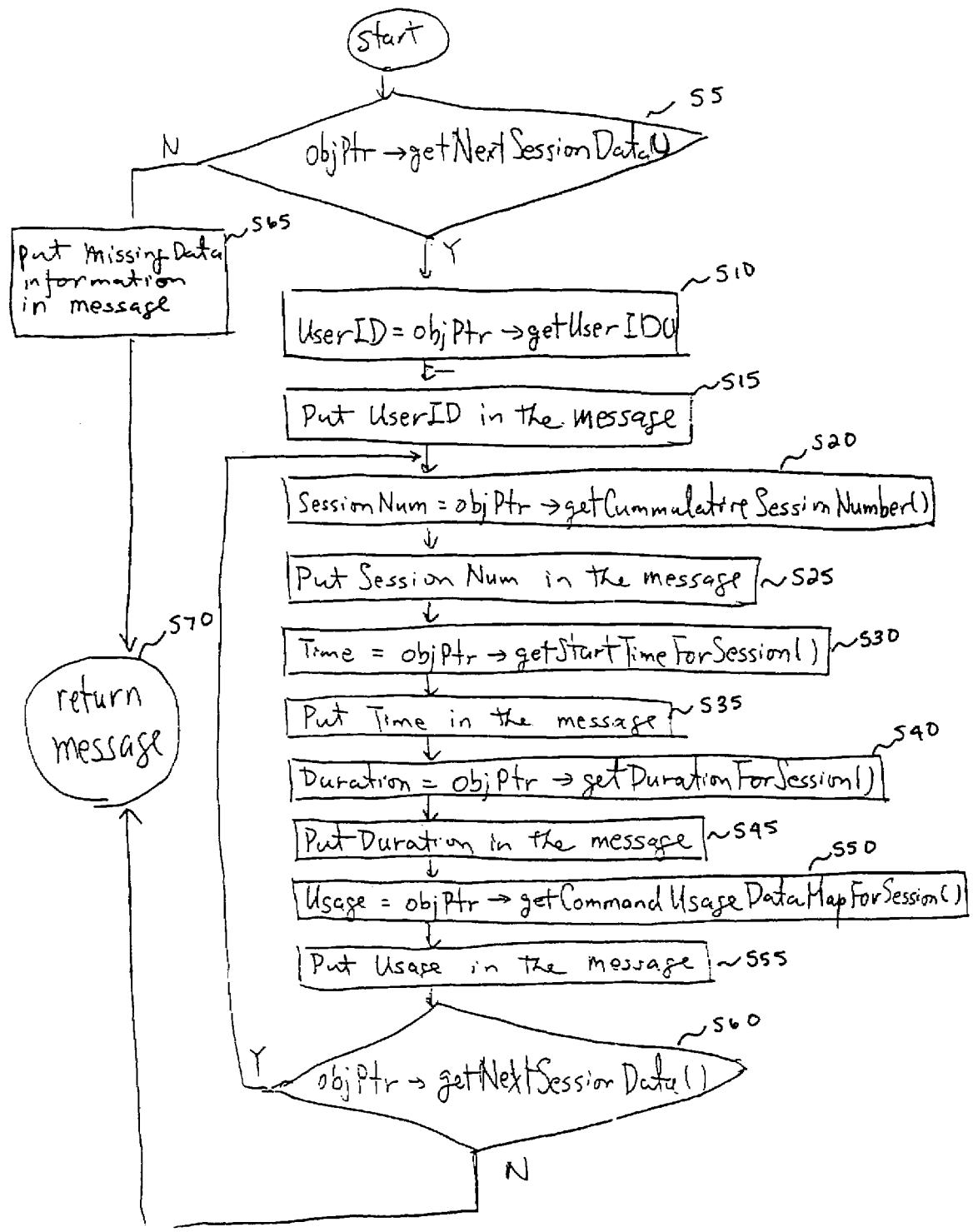
FIG. 19 is a flowchart describing an operation executed in the present invention directed to the accessing of data from an abstract class.

FIG. 19 describes the use of the functions defined in the CUsageInformation abstract class 1800 of FIG. 18. FIG. 19 thus shows the operation executed in the sending block object 1600 to extract the necessary information passed by the monitoring block object 1200. In the operation shown in FIG. 19, an object pointer (objptr) is a pointer to a CUsageInformation object which is actually a pointer to an object of either the derived class CUsageDataForOneSession 1805 or CUsageDataInLogFile 1810. So long as the user of the pointer uses the CUsageInformation portion of the object, such as the virtual functions, there is no loss of information to use the CUsageInformation for both CUsageDataForOneSession 1805 and CUsageDataInLogFile 1810. The sending block object 1600 only sees the CUsageInformation object and doesn't know about the derived classes. The derived class CUsageDataForOneSession 1805 contains the information of interest in a memory such as a DRAM, while the derived class CUsageDataInLogFile 1810 contains the information of interest in a file for multiple sessions. The operation shown in FIG. 19 allows the sending block object 1600 to access data through a uniform method without having to know the number of sessions in or structure of the passed data. In the sending block object 1600, the received pointer to the object is of the CUsageInformation abstract class 1800. The monitoring block object 1200 knows what information to send and assigns the appropriate pointer to the object, and then passes such information to the sending block object 1600.

In further detail, as shown in FIG. 19 in a first step S5 a getNextSessionData function of the object pointer is called to determine if there is any data available. If YES in step S5, indicating that data is present, i.e., that a user is utilizing a target application 505 for which usage is being monitored, the operation then proceeds to step S10 in which the user ID is obtained from an object pointer to one of the derived classes calling a getUserID function. The user ID is then placed in the message, i.e., the data package to be sent by the sending block object 1600, in step S15. The operation then proceeds to step S20 in which a session number is determined based on a getCumulativeSessionNumber function being called by an object pointer to the derived class. The session number is then placed in the message in step S25. The start time is then obtained in step S30 from an object pointer to the derived class calling a getStartTimeForSession function, and the start time is then placed in the message in step S35. The operation then proceeds to step S40 in which the duration of the monitoring is determined by an object pointer calling a getDurationForSession function. The duration of the monitoring is then placed in the message in step S45. The operation then proceeds to step S50 in which the usage information from the monitoring is obtained by an object pointer calling a getCommandUsageDataMapForSession function. The usage information is then placed in the message in step S55.

The operation then proceeds to step S60 in which it is again determined if there is any further data from monitoring the target application 505 by an object pointer calling the getNextSessionData function. If NO in step S60, indicating there is no further data, the operation then proceeds to step S70 in which a message is returned, which indicates that the message to be emailed is at this time completed and ready to be sent. If YES in step S60, the operation then returns to step S20 and then obtains the session number, start time, duration, and usage information for the next session of the target application 505.

If the determination in initial step S5 is a NO, the operation proceeds to a step S65 in which missing data information is placed in the information message, and the operation then proceeds to step S70. That is, in step S5 the getNextSessionData function is called the first time. If No is returned in step S5, then there is no data to send. As a result, the message to be emailed contains data indicating missing information.

FIG. 20 shows a structure map for storing information directed to the use of the commands of the target application 505. In FIG. 20 the term "key" corresponds to a command name, and the term "value" corresponds to a frequency of calling that command, i.e., how many times has the command been called. The C++ language provides a standard template library which contains a map. The map is the table of FIG. 20 which associates the key and the value. If the sequence of the command use is important, the "key" column can also include time information from the start and the "value" column include the name of the command.

Figure 21:
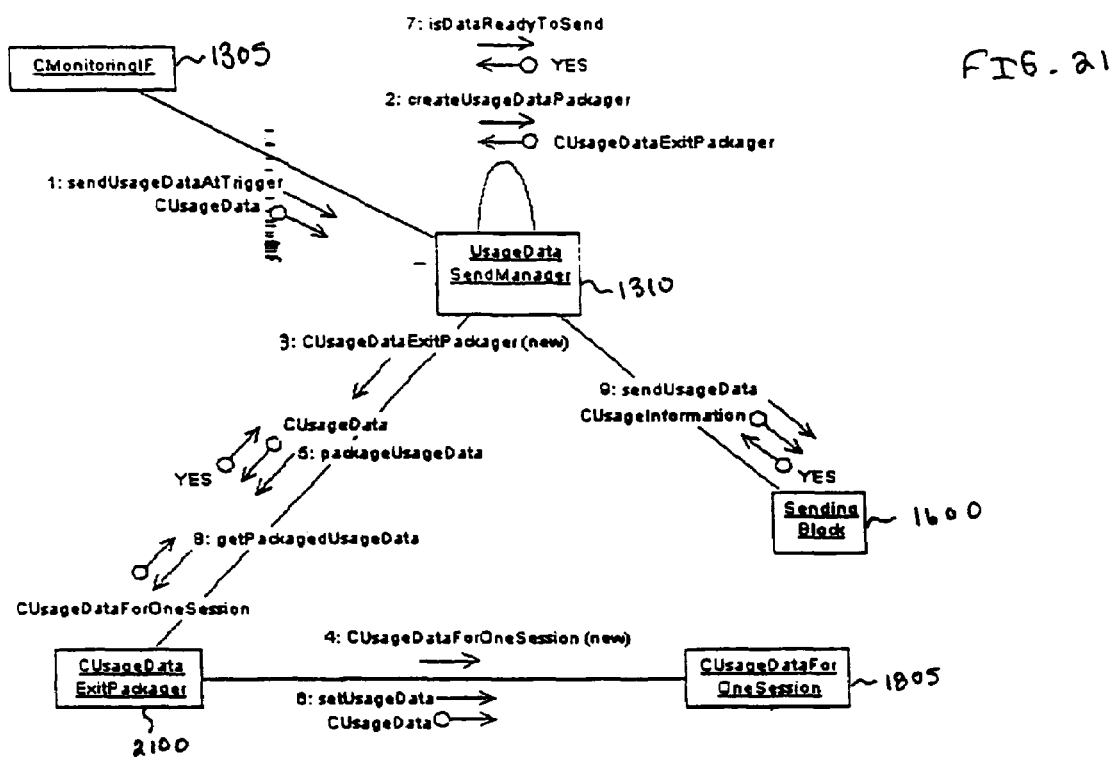
FIG. 21 shows an operation performed in the present invention with respect to a first derived class of an abstract class.
Figure 22:
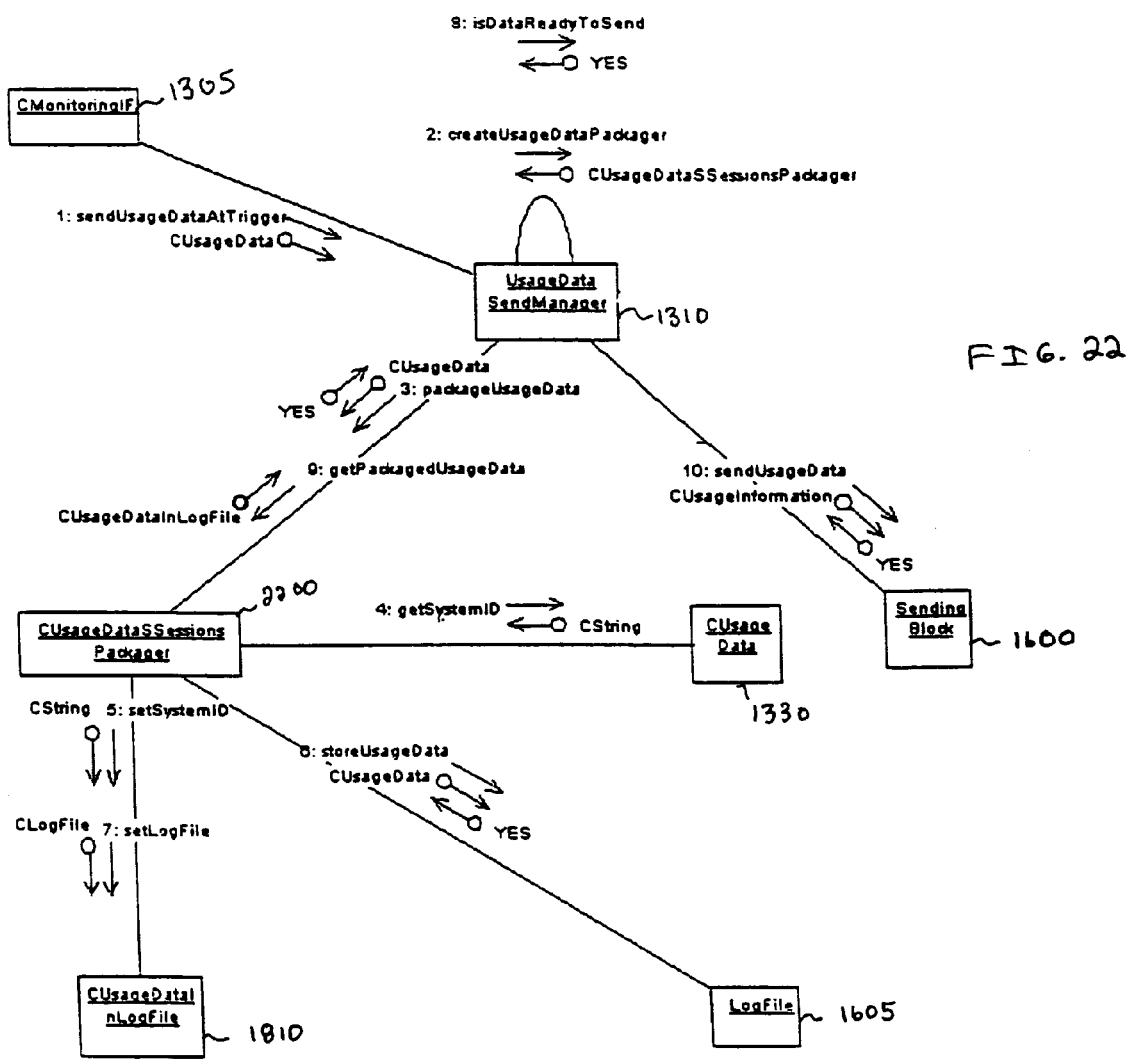
FIG. 22 shows a second operation performed in the present invention directed to a second derived class of an abstract class.

FIG. 21 shows how the monitoring block object 1200 sends the pointer of the CUsageDataForOneSession derived class 1805 and FIG. 22 describes the operation in the monitoring block object 1200 for sending the pointer of the derived class of CUsageDataInLogFile 1810.

As shown in FIG. 21, initially the CMonitoringIF object 1305 calls a sendUsageDataAtTrigger function from the UsageDataSend Manager object 1310, and at the same time sends CUsageData thereto, similarly as shown in FIG. 16A. The UsageDataSendManager object 1310 then calls its own createUsageDataPackager function and generates CUsageDataExitPackager object 2100. The CUsageDataExitPackager object 2100 serves the function of putting monitored usage data into the CUsageDataForOneSession object 1805. The UsageDataSendManager object 1310 then calls a CUsageDataExitPackager function of CUsageDataExitPackager object 2100 to create itself, which in turn calls a CUsageDataForOneSession function to create the CUsageDataForOneSession derived object class 1805. Then, the UsageDataSendManager object 1310 calls a packageUsageData function from the CUsageDataExitPackager object 2100, along with sending the CUsageData thereto. In response to that call, the CUsageDataExitPackager object 2100 calls a setUsageData function from the CUsageDataForOneSession object 1805 along with sending the CUsageData thereto. The UsageDataSendManager object 1310 then calls its own is DataReadyToSend function, and when data is ready to be transmitted it generates a positive YES response to that function call. At this point, the UsageDataSendManager object 1310 calls a getPackagedUsageData function from the CUsageDataExitPackager object 2100, which in reply sends the CUsageDataForOneSession to the CUsageDataSendManager object 1310. The UsageDataSendManager object 1310 then calls a sendUsageData function of the sending block object 1600 along with sending the CUsageInformation thereto. The sending block object 1600 then confirms that it has sent this information by sending a confirmation YES signal to the UsageDataSendManager object 1310.

In the operation shown in FIG. 21, the UsageDataSendManager object 1310 receives the trigger type signals as discussed for example in FIGS. 12A, 16A, and 16B. By executing the operation shown in FIG. 21, the MonitoringBlock object 1200 can send the pointer of the CUsageDataForOneSession derived class 1805, which results in the operation of the sending block object 1600 sending data for one session of monitored usage of a target application 505 by email.

In the operation shown in FIG. 22, several of the same steps as executed in FIG. 21 are also executed. In the operation executed in the monitoring block object 1200 as shown in FIG. 22, the CMonitoringIF object 1305 initially calls a sendUsageDataAtTrigger function, and along with sending CUsageData to the UsageDataSendManager object 1310. In response, the UsageDataSendManager object 1310 calls its own createUsageDataPackager function and generates a CUsageDataSSessionsPackager object 2200. The CUsageDataSSessionPackager object 2200 serves the function of packaging the monitored usage data of several sessions of a target application 505 into the CUsageDataInLogFile object 1810.

The UsageDataSendManager object 1310 then calls a packageUsageData function from the created CUsageDataSSessionsPackager object 2200 along with sending the CUsageData thereto. The CUsageDataSSessions Packager object 2200 packages the monitored usage data into the CUsageDataInLogFile object 1810. The CUsageDataSSessionsPackager object 2200 in response sends a confirmation YES signal to the UsageDataSendManager object 1310 to indicate that it was able to package the usage data.

Then, the CUsageDataSSessionsPackager object 2200 calls a getSystemID function from the CUsageData object 1330, which in return sends a CString with the system ID back to the CUsageDataSSessionsPackager object 2200. Then, the CUsageDataSSessionsPackager object 2200 calls a setSystemID function from a CUsageDataInLogFile derived class object 1810 along with sending the CString data thereto. The CUsageDataSSessionsPackager object 2200 then calls a storeUsageData function from the LogFile object 1605 along with sending the CUsageData thereto; and the Logfile object 1605 then returns a confirmation YES signal to the CUsageDataSSessionsPackager object 2200. The CUsageDataSSessionsPackager 2200 then calls a setLogFile function from the CUsageDataLogInFile object 1810 along with sending the CLogfile data thereto.

During these operations, the UsageDataSendManager object 1310 continually calls a is DataReadyToSend function to itself, and when the data is ready to be sent it generates a confirmation YES. Then, the UsageDataSendManager object 1310 calls a getPackagedUsageData function from the CUsageDataSSessionsPackager object 2200, which in response sends the CUsageDataInLogFile data to the UsageDataSendManager object 1310. The UsageDataSendManager object 1310 then calls a sendUsageData function to the sending block object 1600 along with sending the CUsageInformation thereto. The sending block object 1600 then confirms that it has sent this data by sending a YES signal to the CUsageDataSendManager object 1310.

The UsageDataSendManager object 1310 in the operation of FIG. 22 also receives the trigger information as shown for example in FIGS. 12B, 16A, and 16B. In the operation shown in FIG. 22, the UsageDataSendManager monitor 1310 provides usage data to the sending block object 1600 which contains data of plural sessions, for example five sessions in the examples discussed above. The sending block object 1600 then sends the data of the multiple sessions by email.

With such operations in the present invention, the monitoring block object 1200 performs various functions which are transparent to the sending block object 1600. That is, the sending block object 1600 performs the same operations regardless of the data provided thereto from the monitoring block object 1200. As a result of such a structure and operation in the present invention, the sending block object 1600 is very simple. Moreover, if any changes are needed in the operations executed in a device such as in the present invention, for example if the number of sessions is changed, such a change is transparent to the sending block object 1600, and thus the sending block object 1600 will not have to be rewritten to incorporate such changes to the monitoring block object 1200.

With the above-discussed operations, the present invention provides a control operation for monitoring a user's usage of a user interface which is part of a target application. Further, such an operation of the present invention allows data of the monitored usage to be stored and to be transmitted, at appropriately selected times, by Internet mail. Internet mail is a convenient source of such a transmission because such a transmission of monitored usage data will typically not be time sensitive information. Further, utilizing an Internet mail system to communicate such data can significantly reduce costs of the transmission. Further, since the logged usage data is sent by Internet mail in the present invention, the logged usage data can be automatically sent to a further computer system which may be programmed to analyze the usage data transmitted by Internet mail. Such an operation made possible by the present invention can greatly increase the efficiency of monitoring and analyzing such usage data.

In its preferred implementation, the present invention utilizes computers having separate housings than the device to which they are attached. This would allow the invention to be inexpensively implemented for installations which already have an existing computer for performing the desired processing as the new hardware costs may be reduced. Such an arrangement may also permit implementation of the invention without hardware changes to the device. However, if desired, the present invention may be implemented by including the appropriate processing and data storage capabilities in the device which is being monitored and/or controlled in addition to or as an alternative to a separate computer connected to the device.

This application relates to and builds on various concepts which have been disclosed in the cross-referenced patents and patent applications which have been incorporated into this application by reference. This patent application is intended to include not only the >inventions disclosed in the related applications, but also the combinations of various features and functions of the individual embodiments which have been disclosed in this and each of the related applications. Thus, a feature disclosed in one of the related applications or patents may be readily applied a concept disclosed in this invention, and also, the concepts disclosed in one or more of the other applications may be applied concepts or features disclosed in other(s) of the applications. Further, an email message may be used for only sending, with communication in the other direction being performed using a different mode of communication, such as one of the other communication modes disclosed herein, or a communication mode disclosed in the related patents and patent applications.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs. RAMs, EPROMS, EEPROMS, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

The invention claimed is:

1. A system comprising:
an image forming device comprising an operation panel, the operation panel comprising a plurality of operations to be selected by a user;
a monitoring unit configured to monitor data of selecting of the plurality of operations of the operation panel by the user, and to generate a log of the monitored data, the log of the monitored data being stored in the device, and to automatically start the monitoring without requiring a connection to a receiving device to which the log of monitored data is to be sent and automatically upon start-up of the image forming device without the user directly starting a monitoring program;
a communicating unit configured to receive the log of the monitored data, and to automatically communicate the log of the monitored data by a unidirectional communication without requiring input from the device to which the log of the monitored data is to be sent.

2. A system according to claim 1, wherein the communicating unit sends the log of the monitored data when the user exits the device.

3. A system according to claim 1, further comprising a setting unit configured to set a number of sessions of the device to be executed by the user prior to the communicating unit communicating the log of the monitored data.

4. A system according to claim 3, wherein the log of the monitored data is in a form of an abstract class, and the abstract class includes first and second derived classes, the first derived class storing data of one session and the second derived class storing data of the set number of sessions.

5. A system according to any one of claims 1 and 2-4, wherein the communicating unit communicates the log of the monitored data by Internet mail.

6. A system comprising:
an image forming device comprising an operation panel, the operation panel providing a plurality of operations to be selected by a user;
monitoring means for monitoring data of selecting of the plurality of operations of the operation panel by the user, and for generating a log of the monitored data, the log of the monitored data being stored in the device, and to automatically start the monitoring without requiring a connection to a receiving device to which the log of monitored data is to be sent and automatically upon start-up of the image forming device without the user directly starting a monitoring program;
communicating means for receiving the log of the monitored data, and for automatically communicating the log of the monitored data by a unidirectional communication without requiring input from the device to which the log of the monitored data is to be sent.

7. A system according to claim 6, wherein the communicating means sends the log of the monitored data when the user exits the target device.

8. A system according to claim 6, further comprising a setting means for setting a number of sessions of the device to be executed by the user prior to the communicating means communicating the log of the monitored data.

9. A system according to claim 8, wherein the log of the monitored data is in a form of an abstract class, and the abstract class includes first and second derived classes, the first derived class storing data of one session and the second derived class storing data of the set number of sessions.

10. A system according to any one of claims 6 and 7-9, wherein the communicating means communicates the log of the monitored data by Internet mail.

11. A system according to claim 6, wherein the log of the monitored data is in a form of an abstract class.

12. A method of monitoring usage of an operation panel of an image forming device, the operation panel including a plurality of operations to be selected by a user, comprising the steps of:
  monitoring data of selecting of the plurality of operations of the operation panel by the user;
  generating a log of the monitored data, the log of the monitored data being stored in the device, and to automatically start the monitoring without requiring a connection to a receiving device to which the log of monitored data is to be sent and automatically upon start-up of the image forming device without the user directly starting a monitoring program; and
  receiving the log of the monitored data, and automatically communicating the log of the monitored data by a unidirectional communication without requiring input from the device to which the log of the monitored data is to be sent.

13. A method according to claim 12, wherein the communicating step sends the log of the monitored data when the user exits the device.

14. A method according to claim 12, further comprising a step of setting a number of sessions of the device to be executed by the user prior to the communicating device communicating the log of the monitored data.

15. A method according to claim 14.

16. A method according to any one of claims 12 and 13-15, wherein the communicating step communicates the log of the monitored data by Internet mail.

17. A method according to claim 12, wherein the log of the monitored data is in a form of an abstract class.

18. A computer program product comprising:
  a computer storage medium and a computer program code mechanism embedded in the computer storage medium for causing a computer to monitor a user's usage of an operation panel of an image forming device, the operation panel comprising a plurality of operations to be selected by a user, comprising:
  a first computer code device configured to monitor data of selecting of the plurality of operations of the operation panel by the user, and configured to generate a log of the monitored data, the log of the monitored data being stored in the device, and to automatically start the monitoring without requiring a connection to a receiving device to which the log of monitored data is to be sent and automatically upon start-up of the image forming device without the user directly starting a monitoring program; and
  a second computer code device configured to receive the log of the monitored data, and to automatically communicate the log of the monitored data by a unidirectional communication without requiring input from the device to which the log of the monitored data is to be sent.

19. A computer program product according to claim 18, wherein the second computer code device is further configured to send the log of the monitored data when the user exits the device.

20. A computer program product according to claim 18, further comprising a third computer code device configured to set a number of sessions of the device to be executed by the user prior to the second computer code device communicating the log of the monitored data.

21. A computer program product according to claim 20, wherein the log of the monitored data is in a form of an abstract class, and the abstract class includes first and second derived classes, the first derived class storing data of one session and the second derived class storing data of the set number of sessions.

22. A computer program product according to any one of claims 18 and 19-21, wherein the second computer code device is further configured to communicate the log of the monitored data by Internet mail.

23. A system according to claim 1, wherein the log of the monitored data is in a form of an abstract class.

24. A computer program product according to claim 18, wherein the log of the monitored data is in a form of an abstract class.

* * * * *